(12) United States Patent
Batoni

(10) Patent No.: US 10,717,234 B2
(45) Date of Patent: Jul. 21, 2020

(54) SYSTEM AND METHOD FOR ENHANCED TREATING OF MATTER WITH ENGINEERED ANGULAR MOMENTUM UV PHOTONS

(71) Applicant: NuSpot Technologies, LLC, Charlotte, NC (US)

(72) Inventor: Paolo Batoni, Charlotte, NC (US)

(73) Assignee: NuSpot Technologies, LLC, Charlotte, NC (US)

( * ) Notice: Subject to any disclaimer, the term of this patent is extended or adjusted under 35 U.S.C. 154(b) by 0 days.

(21) Appl. No.: 16/237,843

(22) Filed: Jan. 2, 2019

(65) Prior Publication Data
US 2019/0204482 A1 Jul. 4, 2019

Related U.S. Application Data

(60) Provisional application No. 62/612,771, filed on Jan. 2, 2018, provisional application No. 62/613,794, filed on Jan. 5, 2018.

(51) Int. Cl.
| | |
|---|---|
| *A61L 2/10* | (2006.01) |
| *B29C 59/00* | (2006.01) |
| *B29C 64/268* | (2017.01) |
| *B29C 64/277* | (2017.01) |
| *B33Y 30/00* | (2015.01) |
| *B29C 64/393* | (2017.01) |

(Continued)

(52) U.S. Cl.
CPC .......... *B29C 64/268* (2017.08); *B29C 64/135* (2017.08); *B29C 64/264* (2017.08); *B29C 64/277* (2017.08); *B29C 64/286* (2017.08); *B29C 64/393* (2017.08); *B33Y 10/00* (2014.12); *B33Y 30/00* (2014.12); *G02B 5/1838* (2013.01); *G02B 5/32* (2013.01)

(58) Field of Classification Search
CPC ... B29C 64/268; B29C 64/264; B29C 64/277; B29C 64/286; B29C 64/135; B33Y 10/00; B33Y 30/00; A61L 2/10; A61L 9/20; C02F 1/32
See application file for complete search history.

(56) References Cited

U.S. PATENT DOCUMENTS

| | | | |
|---|---|---|---|
| 2008/0220339 A1* | 9/2008 | Zakrevskyy | G11B 7/25 430/2 |
| 2011/0243498 A1* | 10/2011 | Viswanathan | G02B 6/2706 385/28 |

(Continued)

*Primary Examiner* — Eliza W Osenbaugh-Stewart
(74) *Attorney, Agent, or Firm* — Clements Bernard Walker; Christopher L. Bernard

(57) ABSTRACT

A system for transferring near-UV and/or UV photons with engineered angular momentum on to matter, and treat organic and inorganic substances and/or impurities comprising a coherent or incoherent source of near-UV and/or UV photons, and one or more angular momentum generators configured to deliver near-UV and/or UV photons with optimized spin angular momentum (SAM), orbital angular momentum OAM, and/or a SAM/OAM combination to target organic or inorganic substance and/or impurity, wherein the angular momentum generators are scalable such that they can be fabricated as a stand alone structure, as a structure fabricated on the package of the near-UV and/or UV photon source, or as an integral part of the near-UV and/or UV photon source.

20 Claims, 16 Drawing Sheets

(51) Int. Cl.
*B29C 64/286* (2017.01)
*B33Y 10/00* (2015.01)
*B29C 64/264* (2017.01)
*B29C 64/135* (2017.01)
*G02B 5/18* (2006.01)
*G02B 5/32* (2006.01)

(56) References Cited

U.S. PATENT DOCUMENTS

2015/0289766 A1* 10/2015 Ashrafi .............. A61B 5/0084
　　　　　　　　　　　　　　　　　　　　 600/478
2016/0109361 A1* 4/2016 Wang .................. G01N 21/21
　　　　　　　　　　　　　　　　　　　　 356/435
2018/0287262 A1* 10/2018 Patri .................... H01Q 13/02

* cited by examiner

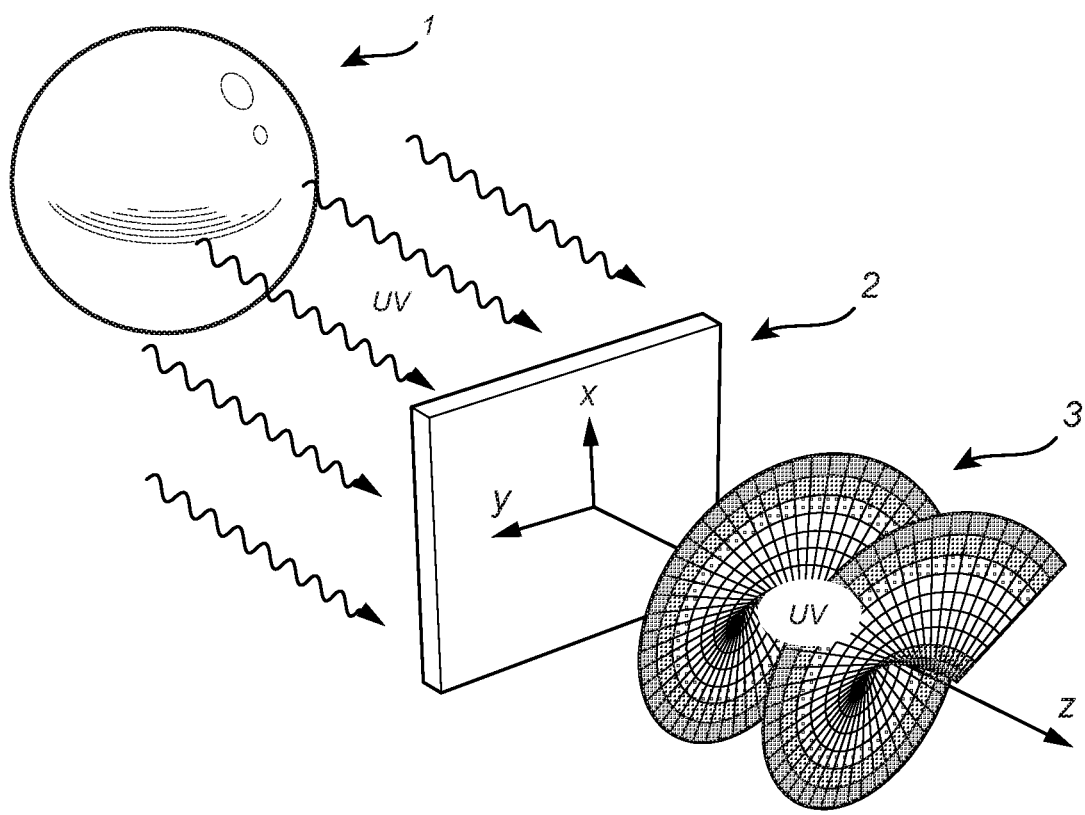
FIG. 4B
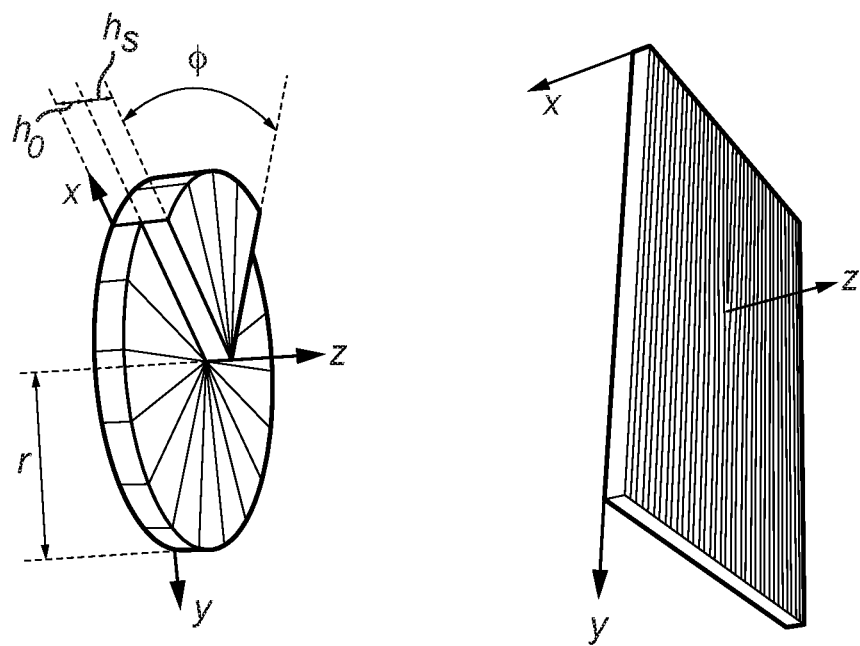
FIG. 4C
FIG. 4D

SYSTEM AND METHOD FOR ENHANCED TREATING OF MATTER WITH ENGINEERED ANGULAR MOMENTUM UV PHOTONS

CROSS-REFERENCE TO RELATED APPLICATION

The present patent application/patent claims the benefit of priority of co-pending U.S. Provisional Patent Application No. 62/612,771, filed on Jan. 2, 2018, and entitled "SYSTEM AND METHOD FOR ENHANCED TREATING OF MATTER WITH ENGINEERED ANGULAR MOMENTUM UV PHOTONS," and U.S. Provisional Patent Application No. 62/613,794, filed on Jan. 5, 2018, and entitled "SYSTEM AND METHOD FOR ENHANCED STEREOLITHOGRAPHY 3D PRINTING," the contents of both of which are incorporated in full by reference herein.

STATEMENT OF GOVERNMENT SUPPORT

The present invention was made with U.S. Government support pursuant to Award No. 140D6318C0009 by the Defense Advanced Research Projects Agency (DARPA). Accordingly, the U.S. Government may have certain rights herein.

FIELD OF THE INVENTION

The present invention relates generally to systems and methods for treating compressible and non-compressible fluids, surfaces, and materials with photons of electromagnetic radiation with engineered angular momentum. More specifically, the present invention relates to systems and methods for using ultraviolet (UV) and/or near-UV photons, or combinations of photons including near-UV and/or UV photons, with engineered angular momentum to treat organic and inorganic substances and/or impurities, including biological materials, unicellular organisms, such as archaea, protozoa, bacteria, viruses, molds, spores, cysts, and multicellular organisms, such as most fungi, and algae.

BACKGROUND OF THE INVENTION

It is well known to those of ordinary skill in the art that compressible and incompressible fluids, such as gases and liquids, surfaces, and materials in general, can be treated with photons in the ultraviolet (UV) segment of the electromagnetic radiation spectrum. Such irradiation may also include combinations other photons in the visible (Vis) and infrared (IR) segments of the electromagnetic spectrum, whose emission can be spontaneously occurring or engineered. Treatment via irradiation with UV photons and/or combinations with Vis-IR photons has multiple goals, and following a few of them are listed: 1) polymerization of chemical compounds, 2) optical excitation, 3) oxidation of species in the presence of a photo-catalyst, 4) decomposition of organic and inorganic compounds, and 5) neutralization of unicellular and multicellular organisms to inhibit their reproduction and so decrease their concentration.

Spontaneous, stimulated, and/or engineered emission of UV radiation has been traditionally provided with a variety of discharge-based sources. Currently, mercury (Hg) vapor lamps play a dominant role as common discharge-based sources because phosphors can be integrated within their structure to emit visible electromagnetic radiation (light) for general lighting applications. For instance, compact fluorescent lamps (CFLs) though being phased out because of concerns linked to Hg pollution and disposal, are found in light fixtures around the world. When used without phosphors, Hg vapor lamps emit electromagnetic radiation in the UV-A, UV-B, and/or UV-C range; therefore—as part of a long-established custom since 1920's, these sources have been used for germicidal applications, and more recently for oxidation, curing, and general treatment purposes.

For the correct functionality of an Hg vapor lamp, it is required that Hg is first vaporized and then ionized; UV photons are not emitted if this sequence is not completed. Warm-up times are therefore required, and during these times a given Hg vapor lamp will not provide an adequate UV irradiation level. There are three main categories of Hg vapor lamps: low pressure (LP), medium pressure (MP), or doped high pressure (HP). An ordinary LP Hg vapor lamp is characterized by relatively broader spectral emission centered at ~254 nm, while a HP Hg vapor lamp exhibits a larger relative spectral emission centered at ~365 nm. Independently of their classification, every kind of Hg vapor lamp exhibits a large distribution of smaller relative electromagnetic spectral emissions that span 185 nm to nearly 600 nm. While the spectral energy distribution of Hg mercury lamps can vary greatly from manufacturer to manufacturer, and from one kind of Hg vapor lamp to another, the energy spectral distribution is fixed for a given Hg vapor lamp. This implies that the single spectral emissions cannot be engineered to be enabled or disabled, red shift or blue shift; similarly, and most importantly the polarization of the emitted photons cannot be controlled either.

A less common kind of high pressure gas discharge is the excimer lamp, whose relatively narrower energy spectral emission (10 to 20 nm) is centered around a fixed wavelength in the range 126 to 352 nm; is broad (10 to 20 nm) and centered around a fixed wavelength in the range 126 to 351 nm. Similarly to other gas discharge lamps, the spectral emission of excimer lamps cannot be engineered to enable or disable desired wavelengths, red or blue shift, and control the polarization of the emitted photons.

Recent progress in excimer lamp technology has enabled microplasma UV sources, which have a much reduced foot print, in some cases comparable to solid state UV sources. Inside a microplasma UV source, stimulated xenon gas confined in microcavities produces UV radiation centered at 173 nm. Phosphors can be used to convert this wavelength in the UV-A, UV-B, or UV-C region of the electromagnetic spectrum including areas of interest in the range 173-220 nm, and at around the germicidal wavelength (260 nm). Microplasma UV sources are of significant commercial interest because their reduced footprint allows application where size constraint have prevented the use of conventional Hg vapor sources. However, similarly to other gas discharge lamps, the polarization of the emitted photons is not engineered.

Hg vapor or excimer lamps are characterized by a form factor, which is inflexible. Additionally, they typically require high power and high voltages; thus, they must use line voltage, and must be addressed as separate components that are not arbitrarily scalable. Because of the inflexible form factor of the Hg vapor, or excimer lamps, the architecture of the system that uses them is constrained. In a disinfection system for fluids, the typically tubular or linear Hg vapor or excimer lamps emit photons that pass through the fluid to be disinfected and are absorbed by another surface, or at best reflected once of twice before they are lost. This translates into a very inefficient use of photons, and a continuous need to generate and replace them. This also creates a scenario where there the radiation field is not uniform. In order compensate for losses and non-uniform radiation fields, increasingly high intensity Hg vapor or excimer lamps must be used.

During the last two decades, solid state sources, such as light emitting diodes (LEDs) and Laser Diodes (LDs) have been engineered to emit UV radiation when a current in applied to them. UV LEDs and LDs are of great commercial interest. Because of their reduced footprint (typically 0.2 mm² to 1 mm²) they can enable commercial applications in disinfection, advanced oxidation, curing, polymerization, optical excitation where architecture constraints have impeded the use of conventional use Hg vapor lamps and excimer Lamps.

Most of the solid state sources, such as light emitting diodes (LEDs) and Laser Diodes (LDs) generate UV radiation by recombining electrically charged carriers (electrons and holes) in the active region of a heterostructure typically made of an III-nitride semiconductor alloy that incorporates specific percentages of aluminum, gallium, and nitrogen.
Ternary III-Nitride Alloy $$Al_xGa_{(1-x)}N$$

where "Al", "Ga", and "N" are the atomic symbols of elemental aluminum, gallium, and nitrogen, respectively; "x" is percent value. In this alloy the percent aluminum does not only determine the chemical composition but also the bandgap of the alloy, and the wavelength of the emitted photon.
Photon Wavelength, λ (nm)

$$\lambda = \frac{1,240}{E_g}$$

where "$E_g$" is the bandgap energy expressed in electronvolt (eV). Based on peer-reviewed literature based values, for an alloy made of 100% aluminum, the bandgap value is 6.2 eV, and 3.4 eV for an alloy containing 0% aluminum, which respectively yields emission of photons with a wavelength of 200 nm, and 365 nm, respectively. By varying the percent of Aluminum between 0% and 100%, solid-state devices such as LEDs can be engineered to generate emission of UV-A, UV-B, and UV-C radiation. While the photon emission can be engineered, the polarization of the emitted photons is not engineered.

Solid-state sources such as UV LEDs and UV LDs, and microplasma UV sources, are used to perform the same functions as Hg vapor lamps. In addition they are environmentally friendly because of the absence of Hg; however, differently from Hg vapor lamps, they enable zero-emission limitations because their on-off operation and their UV emission is pseudo-instantaneous and limited to only a few nanoseconds when supported by adequate electronic drivers.

The use of UV LEDs, UV LDs, and microplasma UV sources are poised for explosive growth because of growing needs to treat compressible and non-compressible fluid, materials, and surfaces and shield general population for the increasing public health threat of drug resistant waterborne and airborne pathogens. The use UV LEDs, UV LDs, and microplasma UV sources will be facilitated by their reduced foot-print, which allows integration in portable devices, and also applications where size constraint is critical, such as small pipes or small surfaces.

UV sources have been historically used for their germicidal effect as early 1920. It is well known to those of ordinary skill in the art that UV radiation can be used to damage the nucleic acids contained within the structure of a unicellular or multicellular organism. Direct and often irreparable damage to the nucleic acids (DNA and RNA) can occur when exposed to UV radiation, and most effectively with UV-C radiation. With damaged nucleic acids, unicellular and multicellular organisms are unable to reproduce, and so they cannot form colonies.

Although it is well known to those of ordinary skill in the art that both DNA and RNA have a board absorption curve spanning from 200 nm to 400 nm; however, they also exhibit and relative, yet moderate maxima peak absorption centered at 260 nm, with the majority of UV absorption occurring between 240 nm and 280 nm. LP and MP Hg vapor lamps have emission peaks at 253.7 nm, with MP Hg vapor lamps having additional secondary and narrow emissions across the peak microbiocidal region of nucleic acids. Similarly, excimer lamps have a quasi-monochromatic emission centered at either 248 nm or 282 nm. Microplasma UV sources can be tuned with phosphors to generate quasi-monochromatic emission centered at 265 nm. UV LEDs, and UV LDs can be tuned to emit a broad emission (10-15 nm Full Width Half Maximum) centered at desired germicidal wavelength, and most commercial devices generate an emission centered anywhere from 255 nm to 285 nm.

Germicidal efforts have naturally targeted 260 nm presuming that maximum damage to nucleic acids would occur in conjunction with maximum optical absorption. This practice has been adopted for decades, and it has lead to a commonly accepted strategy that suggests to use a fixed-wavelength UV radiation to achieve disinfection for any possible microorganism, and provide an exposure to radiation measured in mJ per unit area that has been experimentally, and often empirically determined to neutralize the a desired microorganism. A similar strategy has been accepted for advanced oxidation, photolysis, and photocatalysis, and general irradiation treatment. Thus instead of engineering the wavelength emission of a UV source to target the exact wavelength absorbed by a given contaminant or photocatalyst, and achieve optimal efficiency, UV lamps with fixed emission spectra are matched as closely as possible to target absorption bands, often very inefficiently, to achieve an acceptable effect by means of a "brute force" approach.

A similar method has been used for Advanced Oxidation Processes (AOPs), which have started receiving adequate attention since the late 1980's for application in water treatment. AOPs define a set of procedures mainly designed to removed organic materials in water and wastewater by means of a chemical reaction (oxidation) with hydroxyl radicals (·H) produced by photocatalysis of water molecules in the presence of a photocatalyst (TiO$_2$, NiO$_2$) and UV photons. Recently, the terms AOP has been used to refer so a specific set of chemical processes that use "consumables" such as hydrogen peroxide (H$_2$O$_2$). Following are the most common mechanisms of ·OH production used by AOPs:
Oxidation With Photocatalyst (TiO$_2$)

UV photons absorbed by the surface of TiO2 generates a free electron-hole pair e⁻, h⁺. Water is adsorbed into the TiO2 surface, reacts with holes (h⁺), and ·OH radicals are produced.

$$TiO_2 + UV \rightarrow e^- + h^+$$

$$Ti(IV) + H_2O \rightleftharpoons Ti(IV)\text{---}H_2O$$

$$Ti(IV)\text{---}H_2O + h^+ \rightleftharpoons Ti(IV)\text{---}\cdot OH + H^+$$

Homolytic Bond Cleavage of Hydrogen Peroxide (H$_2$O$_2$):

UV photons cleave O—O bond of $H_2O_2$ and generated formation of ·OH.

$$H_2O_2 + UV \rightarrow 2 \cdot OH$$

AOPs are applicable in many scenarios where a variety of organic contaminants must be neutralized at the same time. However the "brute force" approach to provide a fixed-wavelength UV radiation has affected the development of AOPs with non-negligible drawbacks. UV sources with fixed emission spectra are matched as closely as possible to target absorption centers and often optimization is sacrificed for convenience. For instance, in natural water $H_2O_2$ competes for UV photons with the background matrix, and especially with dissolved organic matter in the 240-300 nm range. Since $H_2O_2$ has a very broad UV absorption, most systems use massive 365 nm sources (relatively inexpensive) to achieve a nearly %1 homolytic cleavage of $H_2O_2$. In this case, "conveniently inexpensive" 365 nm photons are used large quantity to achieve a sufficient ·OH concentration from a yielding method that is 99% inefficient. The uncleaved $H_2O_2$ must be neutralized by other means that cause increasing system cost.

Additionally, the transmission of UV photons is also affected by the transparency of the medium, a phenomenon that is generally described by the Beer-Lambert Law. According to this known law, the attenuation of radiation traveling through a medium is related to the properties of the medium itself, and also directly proportional to the concentration(s) of the attenuating species. such as particles, pollutants, and compounds that are present in the medium.
Beer-Lambert Law $$T = \frac{\phi_e^t}{\phi_e^i} = e^{-\tau} = 10^{-A}$$

where "T" is the Transmittance of the medium, $\Phi_e^t$ is the radiant flux transmitted through the medium, $\Phi_e^i$ is the radiant flux received by the medium, $\tau$ is the optical depth of the medium, A is the absorbance of the medium.
N Attenuating Species in the Medium $$T = e^{-\sum_{i=1}^{N} \sigma_i \int_0^l n_i(z)dz} = 10^{-\sum_{i=1}^{N} \xi_i \int_0^l c_i(z)dz}$$

where "$\sigma$" is the attenuation cross section of the attenuating species "i" in the medium, "$n_i$" is the number density of the attenuating species "i" in the medium, "$\xi_i$" in the absorptivity of the attenuating species "i" in the medium, "$c_i$" in the amount concentration of the attenuating species "i" in the medium, and "l" is the path length of the radiation through the medium.

Another naturally occurring phenomenon that hinders the treatment of compressible and non-compressible fluids, surfaces and materials with UV photons is the Rayleigh scattering, which is the dominant elastic scattering of electromagnetics radiation by particles of organic and inorganic material, unicellular and multicellular organisms that are at least 10× smaller than the wavelength of the radiation. This phenomenon can occurs when electromagnetic radiation travels trough solids, liquids, and gases that are transparent to the radiation itself. This phenomenon is caused by the electric polarizability of matter organized into a "particle" much smaller than the irradiating wavelength. The oscillating electric field of an electromagnetic wave acts on the charges within the "particle" causing them to resonate with a similar frequency. In this case the "particle" turns into a radiating dipole that scatters electromagnetic radiation.

Several impediments that stem from the Beer-Lambert Law, and the Rayleigh scattering seriously hinder the use of UV radiation for treatment of fluids, and especially water. In water with a transparency level of 70% to germicidal range UV radiation, the attenuation of the radiation is so severe to require significant exposure times, and amounts of energy per unit area often so exceptionally large that they cannot be provided by UV sources. Thus this requires filtering the water and further processing to increase its level of transparency. This is especially hindering for high purity, or drinking water processing industries, and water municipality, which deal with vast amounts of water that needs to be processed and treated rapidly. The Rayleigh scattering allows small unicellular and multicellular microorganism to scatter UV radiation, resisting its damaging effects. The presence of certain viruses in water hence requires irradiation with exceptionally large amounts of UV radiation.

There is a plethora of unicellular organisms such as archaea, protozoa, bacteria, viruses, molds, and spores that can be easily differentiated from one another, and categorized. However, this does not mean that all microorganisms in the same category are created equal. Experimentally determined UV rate constants reported in the literature indicate that some microorganisms are more resistant to UV irradiation than other microorganisms. In fact, there are several factors that determine the level of resistance of a microorganism to UV irradiation. Some of these factors have been addressed with novel technologies (Table 1), while others have not yet been addressed with targeted technology. (Table 2).

TABLE 1

Factors in Microorganism UV Resistance Addressed with Technology

| | |
|---|---|
| Double stranded vs. single stranded DNA | Double stranded DNA is less affected by UV damage because it can be repaired or photo reactivated. Solid-state optoelectronics, mercury-gas discharge, micro-plasma technology provide sources that can be engineered to emit combinations of narrow, or quasi-narrow UV emissions that abate the effects of photo reactivation and photo repair. For instance, Medium pressure mercury-gas discharge (MP) UV lamps have been reported to have an advantage over the counterpart low-pressure (LP) UV lamps for disinfection of bacteria in water in terms of photo reactivation. In addition to nucleic acid damage, the polychromatic output of MP UV lamps also allows protein degradation and enzymatic breakdown, which is associated with a higher level of inactivation of microorganisms with respect to the same microorganisms treated with an equivalent dose of radiation from LP UV lamps. |
| Length of DNA Strand | Shorter DNA strands are more susceptible to significant UV damage compared to longer DNA strands; the quantum inactivation yield is indirectly proportional to its molecular weight. Industrial MP UV lamp based systems can provide significantly high doses of germicidal radiation (one order of magnitude larger than counter part LP UV lamp based systems). This allows a "brute force approach" that reduces the importance of the length of DNA strand as a variable. |
| High CG Content | Cytosine binds specifically to Guanine with a triple hydrogen bonding (CG), which is energetically more stable that the double hydrogen bonding that binds Adenine with Thymine (AT). Nucleic acid strands with a high content of CG are more resistant to UV induced damage. Solid-state optoelectronic technology (Light Emitting |

TABLE 1-continued

Factors in Microorganism UV Resistance
Addressed with Technology

Diodes, and Laser Diodes) provide sources that that can
be engineered to emit narrow and/or quasi-narrow UV
emissions that specifically target the peak optical
absorption of AT as a method to induce targeted damage
to a nucleic acid strand.

TABLE 2

Factors in Microorganism UV Resistance
Not Addressed by Technology

| | |
|---|---|
| UV Photon Statistical Absorption | Only a very small fraction of UV photons cause UV damage because 1) UV photons must be first absorbed (Grotthus-Draper) before a photochemical reaction can take place, and 2) even if a UV photon is absorbance occurs, a photochemical reaction may not necessarily takes place (Stark-Einstein). |
| Microorganism Size | Microorganisms << 10X smaller than the wavelength that irradiates them will cause Rayleigh scattering. Thus, microorganisms with a diameter of 20 to 30 nm would only partially inhibit the Rayleigh effect for germicidal wavelengths (254 to 280 nm). |
| Shielding and/or Inner Filter Effect | Capsid protein, lipids, or other packaged viral proteins can shield DNA from UV photons. Similarly UV photons can be absorbed by various absorption centers before they can hit the nucleic acid and have chance to be absorbed and induce nucleotide dimerization. |

It is well known to those of ordinary skill in the art that the field of physics offers different definitions of electromagnetics radiation.

In classical electrodynamics, electromagnetic radiation is defined with the concept of electromagnetic waves, which are a oscillations of electric and magnetic fields, synchronized and perpendicular to each other and perpendicular to the direction of the wave propagation, forming a transverse wave. In other words, if the direction of the wave propagation in the x-direction in the x-plane of a 3D Cartesian axis system, then the oscillations of the electric and magnetic fields occur in the y-z plane.

In quantum theory of electromagnetism, electromagnetic waves consist of elementary, massless particles called photons, which are responsible for all electromagnetic interaction. Energy is carried by photons, and the energy of each single photon is quantized and expressed by Planck's equation.

Planck's Equation $$E = h\nu$$

where "h" is Planck's Constant, and "v" is the frequency of the photon.

The wavelength of the photon generated in the active region of a semiconductor-based heterostructure can be linked to Plank's equation.

Photon Wavelength, λ (nm) and Planck's Equation $$E = h\nu = h\frac{c}{\lambda} \therefore \lambda(nm) = h\frac{c}{E} = \frac{(4.136 \times 10^{-15} \text{ eV s})(2.998 \times 10^8 \text{ m s}^{-1})}{E} = \frac{1{,}240}{E_g}$$

where "$E_g$" is the bandgap energy of the active region of a semiconductor-based heterostructure of the expressed in electronvolt(eV).

It is well known to those of ordinary skills that electromagnetic radiation carries energy. Nonetheless, it is less widely known that electromagnetic radiation also carries momentum, which is a characteristics property of an object in translational motion, or more precisely the movement that changes the physical position of an object, as opposed to rotational motion. Most can relate to the Newtonian definition of momentum as the product of the mass of the velocity of an object in translational motion, which is less intuitive when applied photons as massless particles; nonetheless, practical evidence that electromagnetic radiation carries momentum is found in the physical phenomenon known as "radiation pressure", in which a flux of photons transfer their momentum to an absorbing or scattering object and exert pressure on it.

The magnitude of the pressure exerted on a body by radiation, when the momentum carried by the former is transferred by the radiation, is relatively speaking small and therefore difficult to be observed by human beings without the aid of instrumentation. But it the overall scheme of things, radiation pressure can have non-negligible effects. If the pressure exerted by radiation emanated by the Sun in our solar system were not considered (determined to be 1,361 $Wm^{-2}$ at 1 AU, i.e. the distance from the Sun to Earth.), the trajectory of spacecraft in our solar system would have been affected with significant theoretical vs. experimental deviations.

Experimental proof that electromagnetic radiation carries momentum was obtain during the years 1901-1903 by Russian physicist Pyotr Lebedev, and American physicists Earnest Fox Nichols and Gordon Ferrie Hull, following the assertion that electromagnetic radiation carries momentum published by Scottish scientist James Clerk Maxwell in 1865. However, it was the German astronomer Johannes Kepler that first reported in 1619, that the tail of a comet always points away from Sun, intuiting that sunlight was exerting some force on the comet tail.

The concept that electromagnetic radiation carries momentum is very important because the implication is that momentum is a conserved quantity. In other words, the momentum carried by electromagnetic radiation remains unchanged until acted upon by an external system, or transferred or absorbed by another body, or matter in general. The exchange of momentum with matter is a phenomenon that is not widely known. Thought is has been exploited to generate optical tweezers, the interaction of momentum carried by UV photons with matter is not widely known because both UV photon sources and UV compatible materials have been historically scarce.

As it travels in space, electromagnetic radiation can also rotate around its own axis of propagation. This rotation can assume two distinct forms, which are associated with two distinct forms of angular moment.

One form of rotation is characterized by the circular polarization of the electromagnetic magnetic wave, which occurs when the electric field vector rotates at a constant rate around the propagation axis (circular polarization). A circularly polarized electromagnetic wave can be in one of two possible states, namely right or left circular polarization. From quantum physics point of view, the circular polarization is linked to the spin of a phonon, which too can be found in one of two possible states, namely right or left spin.

The other known form of rotation is characterized by the shape of the wavefront, which is the distribution is space of propagation points (surface) characterized by the same phase.

The form or rotation involving the electric field vector of an electromagnetic wave (or photon spin) is associated with a kind of angular momentum known as Spin Angular Momentum (SAM); the form or rotation involving the shape of the wavefront is associated with a kind of angular momentum known as Orbital Angular Momentum (OAM).

Spin Angular Momentum (SAM) is associated with the circular polarization of the electromagnetic magnetic wave, which occurs when the electric field vector rotates at a constant rate around the propagation axis. Depending on the field rotation and the commonly accepted conventions, the circular polarization can be "left" or "right" as illustrated. From a quantum physics point of view, electromagnetic radiation carries SAM when photons carry a spin angular momentum of ±h, where h is the reduced Plank constant, and the + is the sign associated with left circular polarization, and the − is the sign associated with right circular polarization. In other words the circular polarization is linked to the spin of a phonon, which too can be found in one of two possible states, namely right or left spin.

Orbital Angular Momentum (OAM) is associated on the field spatial distribution of the electric field, not with its polarization. It is categorized as external or internal OAM. The external OAM is origin dependent angular momentum that results from the cross product of special location of the center of the beam of electromagnetic wave and it total linear momentum. The internal OAM is associated with an origin-independent angular moment with a helical mode. Helical modes of electromagnetic fields are characterized by wavefront that is shaped like a helix, with an optical vortex at the center of the electromagnetic radiation beam. In this case of non-cylindrical symmetry wave propagating along the z-axis, the OAM can be expressed as $$L_z = m\hbar$$

where $\hbar$ is the reduced Plank constant, and m is an integer called the topological charge. If m≥2 then the wavefront is composed of |m| distinct yet intertwined helixes with step length equal to |m|λ, where λ is the wavelength of the electromagnetic radiation wave, and direction determined by the sign of |m|. If m=1, then the wavefront is composed by a single helical surface with step length equal to λ. If m=0, then mode if not helical, and wavefront is composed by a simple flat surface.

It is less commonly known that angular momentum carried by electromagnetic radiation can be transferred on to matter. When electromagnetic radiation carrying a non-zero angular momentum (SAM or OAM) impinges on the axis of an absorbing particle, the particle will absorb the angular momentum; this causes the absorbing particle to acquire a rotational motion. If the absorbing particle is impinged off-axis by different photons carrying different angular momenta, then the particle will be subjected to a combination of different rotational motions. SAM will induce rotational motion around the axis of an absorbing particle (particle spinning). OAM will induce a revolution of the absorbing particle around the OAM axis of the electromagnetic radiation; the form or rotation involving the shape of the wavefront is associated with a kind of angular momentum known as Orbital Angular Momentum (OAM).

Circular polarization of electromagnetic radiation, which carries spin angular momentum (SAM) is commonly achieved by means of quarter wave plates, which are planar devices made of birefringent materials. These birefringent materials are crystalline materials that exhibit an index of refraction dependent of the crystallographic direction. Birefringent materials are characterized by two possible optical paths corresponding to two different indexes of refraction, which basically describe the speed of propagation of electromagnetic radiation in a given medium. Within a birefringent material, electromagnetic radiation can propagate with two distinct possible speeds depending on the direction of electromagnetic radiation. A quarter wave plate is designed so that electromagnetic radiation propagating in the direction with the larger index of refraction is retarded by 90° in phase with respect to the phase of the electromagnetic radiation propagating in the direction with the smaller index of refraction.

There are several methods to generate orbital angular momentum (OAM), including holograms (pitch-fork, fork-like, or computer generated spatial light modulators), Q-plates, Cylindrical Mode Converters, and dielectric metasurfaces.

Holograms include design algorithms for obtaining super-resolution with coherent, incoherent, or a mixture of coherent or incoherent radiation near-UV and/or UV radiation.

Traditionally, super-resolution is achieved with lenses, which are designed numerically by modifying a pattern of concentric rings until the target design is obtained. Though this approach can potentially be extended to incorporate additional design criteria, it does usually not allow one to design a specified trade-off between resolution and power efficiency, nor the location of the undesired side lobes in the super-resolving focal plane.

There exist design algorithms for obtaining super-resolution with coherent, incoherent, or a mixture of coherent or incoherent radiation near-UV and/or UV radiation.

The Prior Discrete Fourier Transformation (PDFT) algorithm is an example of design algorithm for obtaining super-resolution with coherent near-UV and/or UV radiation.

The PDFT algorithm was originally conceived as a super-resolution imaging technique. The mechanism of the PDFT algorithm may be summarized as follows. At a finite set of arbitrary points, the signal value is expressed as the superposition of a set of linear independent functions, which express prior knowledge we have about the signal synthesis problem. For super-resolution filters this may be the bandwidth of the signal and the functions are shifted Sinc functions. The solution of the PDFT provides the minimum norm transmission function compatible with the specified signal values.

Generally, the PDFT solution will be real valued or complex valued and an addition-encoding step is necessary to turn the PDFT solution into the phase-only transmission function of a standard diffractive optical element.

Nonlinear design algorithms have also been used to design super-resolution filters. These algorithms optimize the zone width of domains of constant phase inside the DOE aperture, either matching a finite set of signal samples, or optimizing additional components of a more complex cost function.

More recently, super-resolution elements were demonstrated based on the concept of super-oscillations. The design mechanism is very similar to the PDFT, but done in the z-transform domain, which unnecessarily limits the specified signal points to zero crossings of the output spot.

What is still needed in the art, however, is a system that can that generate UV photons with engineered SAM, OAM, and/or a combination of both to achieve optimized angular momentum transfer onto matter (nucleic acids, protein, photoinitiators, photosensitizers to cite a few), and to treat organic and inorganic substances and/or impurities, including biological materials, unicellular organisms such as archaea, protozoa, bacteria, viruses, molds, spores, cysts, and multicellular organisms, such as most fungi, and algae.

BRIEF SUMMARY OF THE INVENTION

In various exemplary embodiments, the present invention provides a system for transferring near-UV and/or UV photons with engineered angular momentum on to matter, and treat organic and inorganic substances and/or impurities comprising a coherent or incoherent source of near-UV and/or UV photons, and one or more angular momentum generators configured to deliver near-UV and/or UV photons with optimized spin angular momentum (SAM), orbital angular momentum OAM, and/or a SAM/OAM combination to target organic or inorganic substance and/or impurity, wherein the angular momentum generators are scalable such that they can be fabricated as a stand alone structure, as a structure fabricated on the package of the near-UV and/or UV photon source, or as an integral part of the near-UV and/or UV photon source.

In one exemplary embodiment, the present invention provides a system for generating and transferring near-UV and/or UV photons with engineered angular momentum to matter and to treat organic or inorganic substances and/or impurities, the system comprising: one of a coherent source and an incoherent source of one or more of near-UV photons and UV photons; and one or more angular momentum generators configured to impart the one or more of the near-UV photons and the UV photons with one or more of spin angular momentum (SAM) and orbital angular momentum (OAM); wherein the angular momentum generators are one or more of fabricated as stand-alone structures, fabricated on a package of the one of the coherent source and the incoherent source, and fabricated as an integral part of the one of the coherent source and the incoherent source. The system further comprises means for obtaining one or more of super-resolution near-UV photons and super-resolution UV photons one or more of fabricated as a stand-alone structure, fabricated on the package of the one of the coherent source and the incoherent source, and fabricated as an integral part of the one of the coherent source and the incoherent source. Optionally, the one or more angular momentum generators comprise one or more Spiral Phase Plates made of a UV transparent material operable for imparting OAM. Alternatively, the one or more angular momentum generators comprise one or more computer generated diffraction gratings with groove bifurcation comprising one of a fork hologram, a pitchfork hologram, and a fork-like hologram operable for imparting OAM by passing a flux of electromagnetic radiation having incident circular Lauerre-Gaussian through the computer generated diffraction grating. Optionally, the one or more computer generated diffraction gratings comprise one or more phase filters exhibiting super-resolution capabilities. Alternatively, the one or more angular momentum generators comprise one or more Q-plates operable for imparting one or more of SAM and OAM. Optionally, the one or more Q-plates are implemented dynamically using one or more of liquid crystals, polymers, and subwavelength gratings. Alternatively, the one or more angular momentum generators comprise one or more thin single domain magnetic needles approximating a magnetic monopole used to generate an optical vortex operable for imparting OAM. The one of the coherent source and the incoherent source comprises one of a UV Laser, a UV Light Emitting Diode, and a UV emitting plasma discharge lamp. Alternatively, the one or more angular momentum generators comprise a Prior Discrete Fourier Transformation (PDFT) phase filter that exhibits super-resolving capabilities configured to deliver a super-resolved beam configured to be coupled to an optical fiber.

In another exemplary embodiment, the present invention provides a system for generating and transferring a super-resolved beam of near-UV and/or UV photons with sub-wavelength beam diameter and with engineered angular momentum to matter and to treat organic or inorganic substances and/or impurities, the system comprising: one of a coherent source and an incoherent source of one or more of near-UV photons and UV photons; means for obtaining one or more of super-resolution near-UV photons and super-resolution UV photons; and one or more angular momentum generators configured to impart the one or more of the near-UV photons and the UV photons with one or more of spin angular momentum (SAM) and orbital angular momentum (OAM); wherein the means for obtaining and the angular momentum generators are one or more of fabricated as stand-alone structures, fabricated on a package of the one of the coherent source and the incoherent source, and fabricated as an integral part of the one of the coherent source and the incoherent source. Optionally, the one or more angular momentum generators comprise one or more Spiral Phase Plates made of a UV transparent material operable for imparting OAM. Alternatively, the one or more angular momentum generators comprise one or more computer generated diffraction gratings with groove bifurcation comprising one of a fork hologram, a pitchfork hologram, and a fork-like hologram operable for imparting OAM by passing a flux of electromagnetic radiation having incident circular Lauerre-Gaussian through the computer generated diffraction grating. Optionally, the one or more computer generated diffraction gratings comprise one or more phase filters exhibiting super-resolution capabilities. Alternatively, the one or more angular momentum generators comprise one or more Q-plates operable for imparting one or more of SAM and OAM. Optionally, the one or more Q-plates are implemented dynamically using one or more of liquid crystals, polymers, and subwavelength gratings. Alternatively, the one or more angular momentum generators comprise one or more thin single domain magnetic needles approximating a magnetic monopole used to generate an optical vortex operable for imparting OAM. The one of the coherent source and the incoherent source comprises one of a UV Laser, a UV Light Emitting Diode, and a UV emitting plasma discharge lamp. Alternatively, the one or more angular momentum generators comprise a Prior Discrete Fourier Transformation (PDFT) phase filter that exhibits super-resolving capabilities configured to deliver a super-resolved beam configured to be coupled to an optical fiber.

In a further exemplary embodiment, the present invention provides a system for generating a super-resolved beam of near-UV and/or UV photons with sub-wavelength beam diameter and/or features, the system comprising: one of a coherent source and an incoherent source of one or more of near-UV photons and UV photons; means for obtaining one or more of super-resolution near-UV photons and super-resolution UV photons; and one or more angular momentum generators configured to impart the one or more of the near-UV photons and the UV photons with one or more of spin angular momentum (SAM) and orbital angular momentum (OAM); wherein the means for obtaining and the angular momentum generators are one or more of fabricated as stand-alone structures, fabricated on a package of the one of the coherent source and the incoherent source, and fabricated as an integral part of the one of the coherent source and the incoherent source.

BRIEF DESCRIPTION OF THE DRAWINGS

The present invention is illustrated and described herein with reference to the various drawings, in which.

DETAILED DESCRIPTION OF THE INVENTION

Figure 1A:
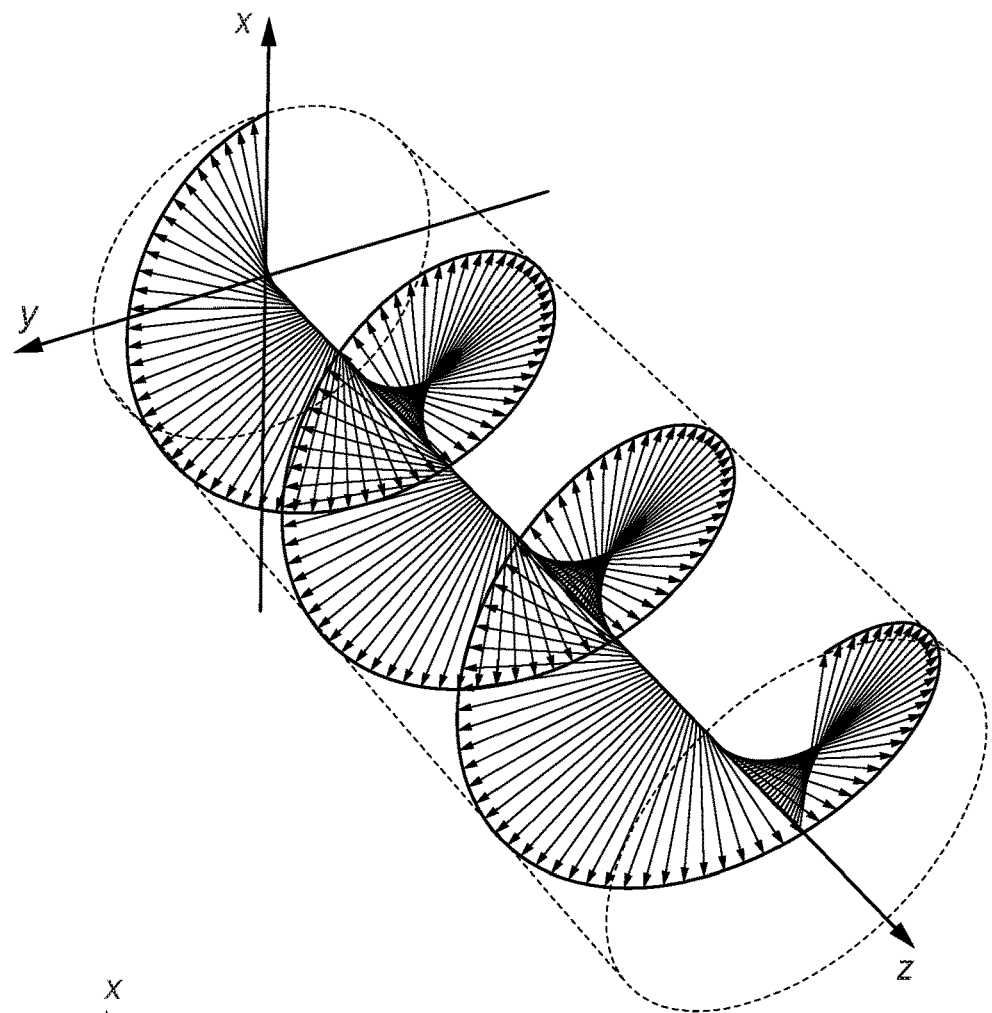
FIG. 1 is a schematic diagram illustrating a conceptualized circular polarization of an electromagnetic wave; the rotation of the electric field component of the electromagnetic wave around the propagation axis is shown: [A] right circularly polarized, and [B] left circularly polarized.
Figure 1B:
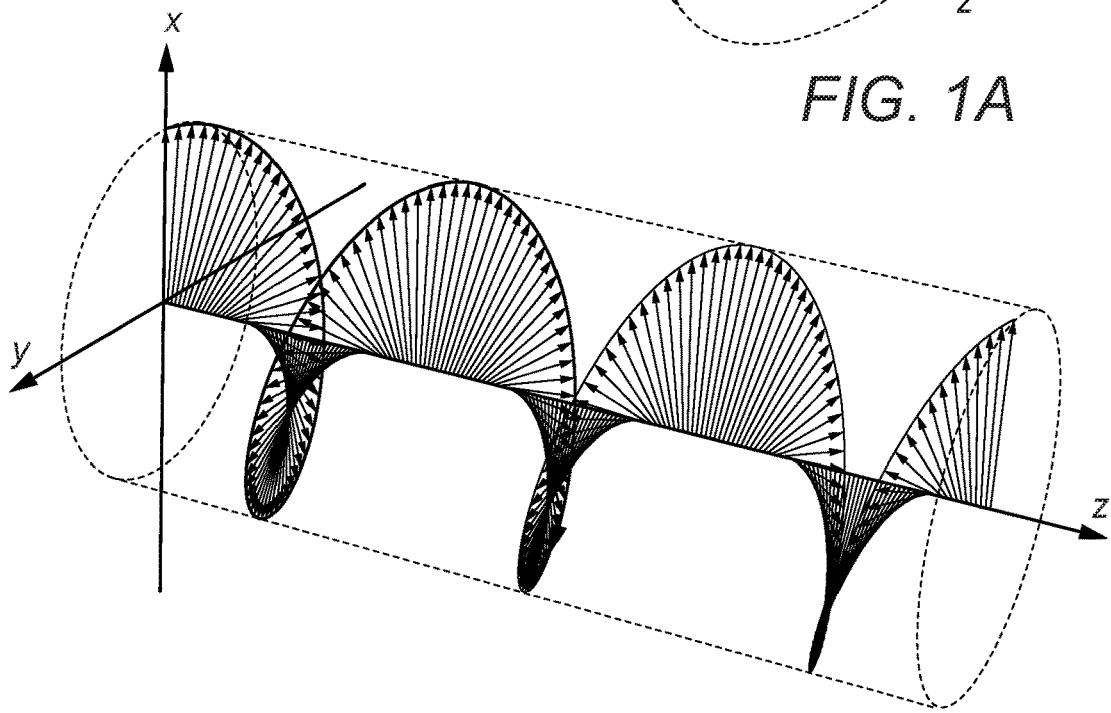
Figure 2A:
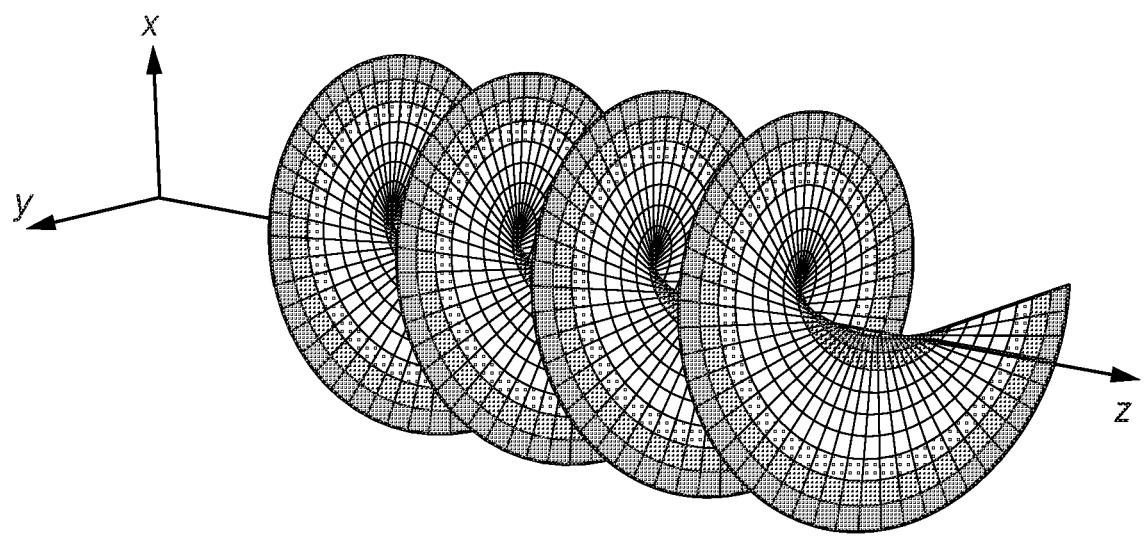
FIG. 2 is a schematic diagram illustrating a conceptualized wavefront of an electromagnetic wave carrying Orbital Angular Momentum (OAM); in this specific case, the illustration shows OAM with topological charge, m=±1:[A] m=−1[B] m=+1.
Figure 2B:
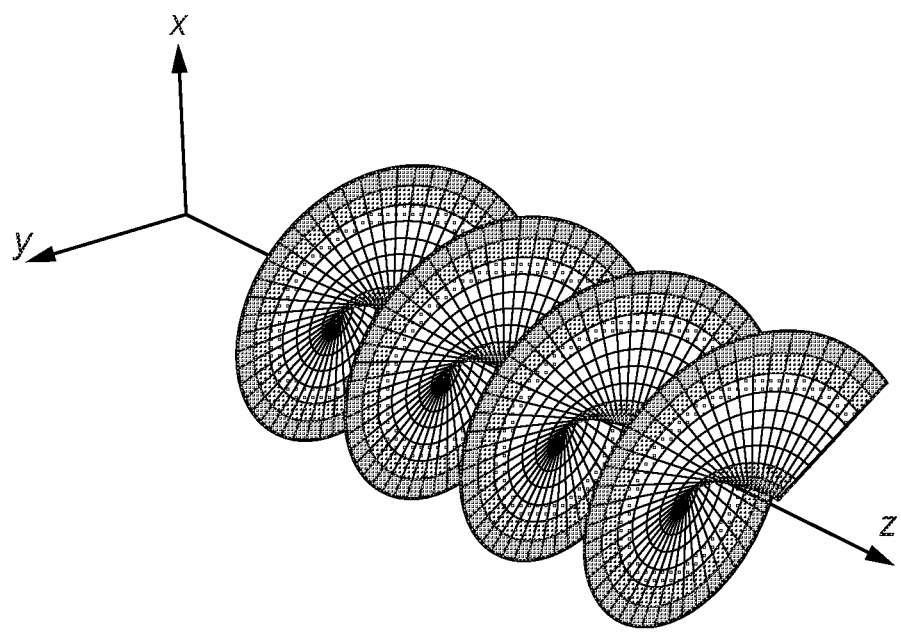
Figure 3A:
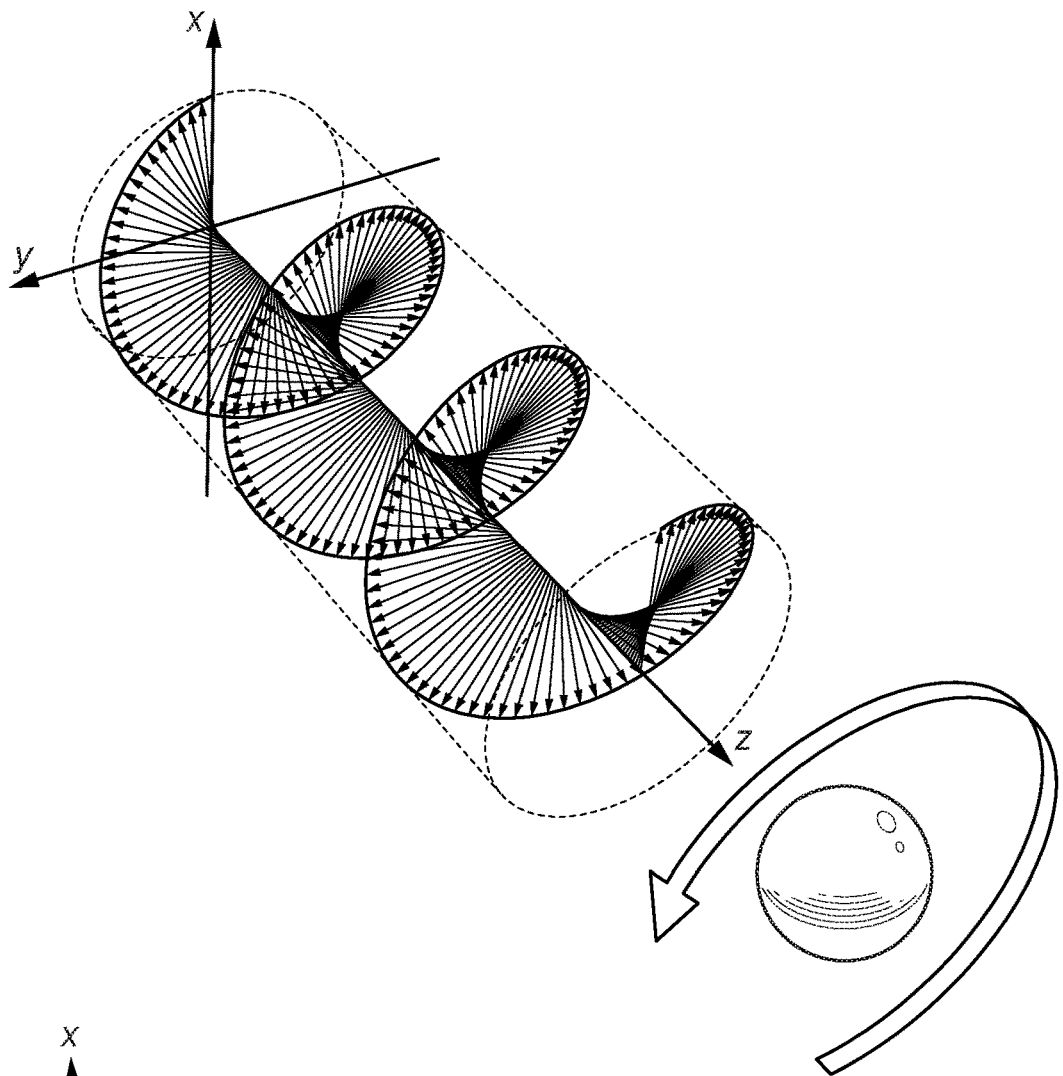
FIG. 3 is a schematic diagram illustrating a conceptualized exchange of spin and angular momentum with matter; [A] Spin angular momentum transfer on to an absorbing particle, which acquires a rotational motion; [B] Orbital angular momentum transfer on to an absorbing particle, which will revolve around the OAM axis of the beam of electromagnetic radiation.
Figure 3B:
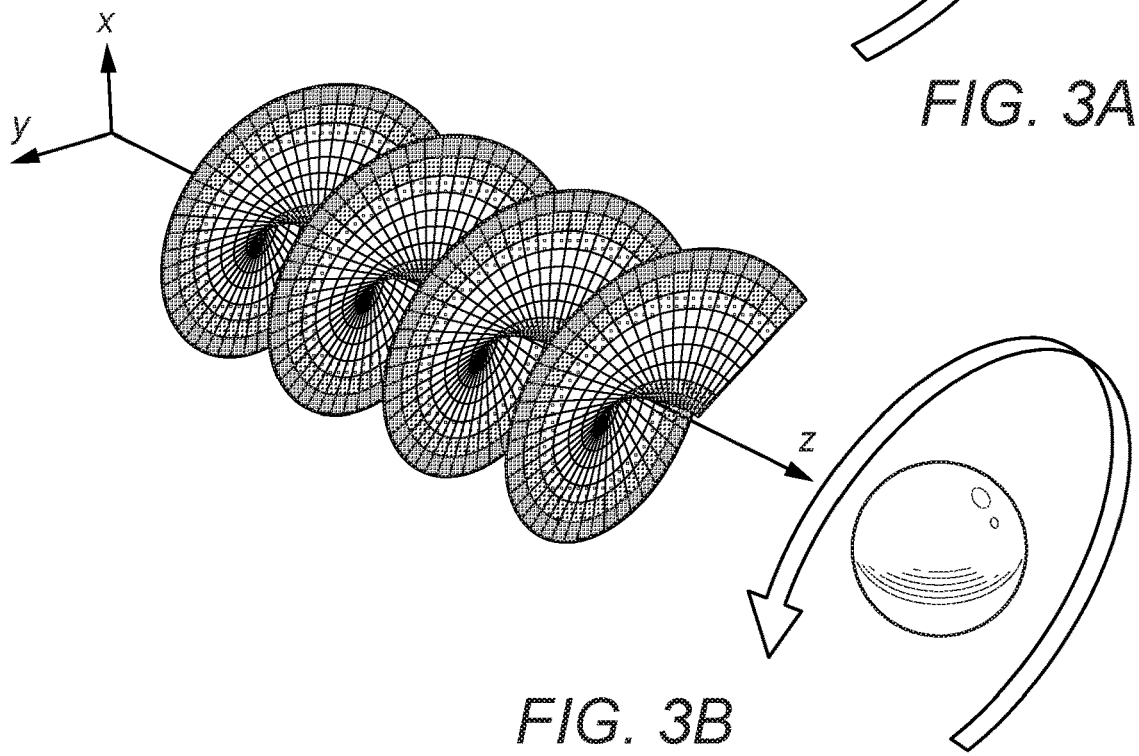
Figure 4A:
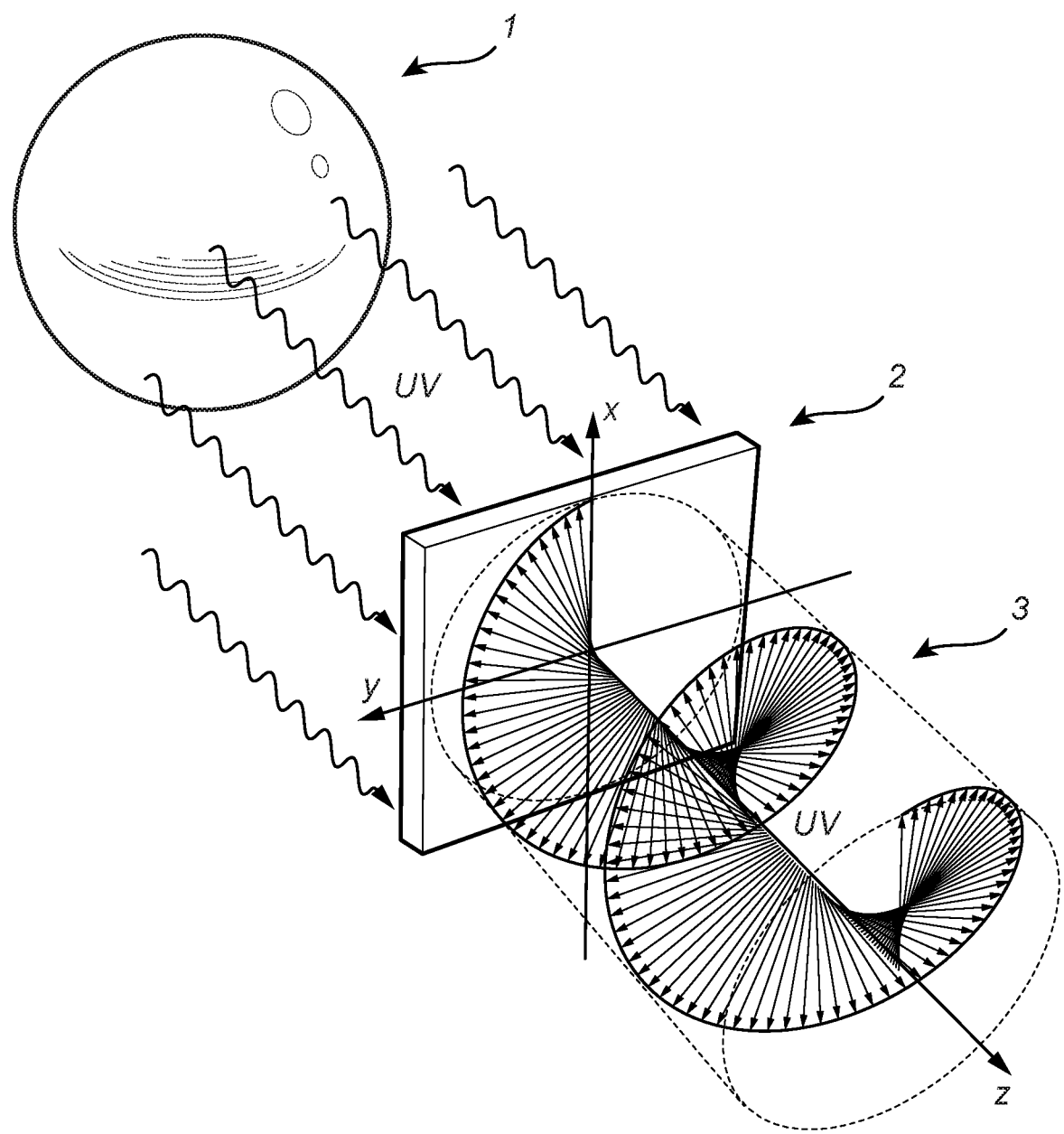
FIG. 4 is a schematic diagram illustrating one exemplary embodiment of the system and method for the enhanced treating of matter with engineered angular momentum UV photons.
Figure 4E:
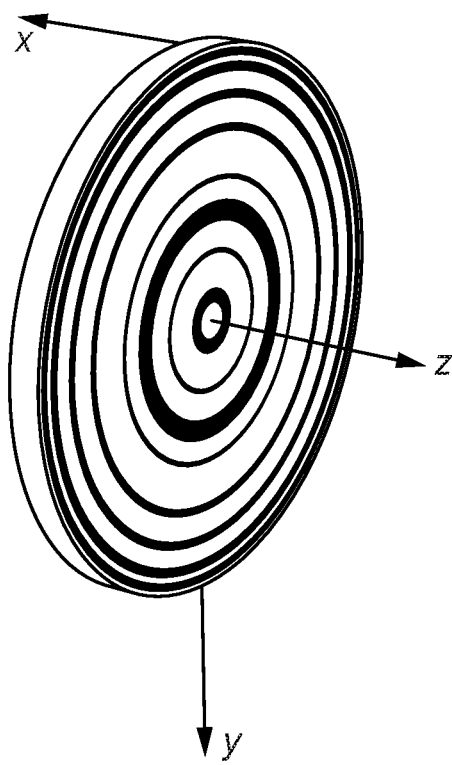
Figure 4F:
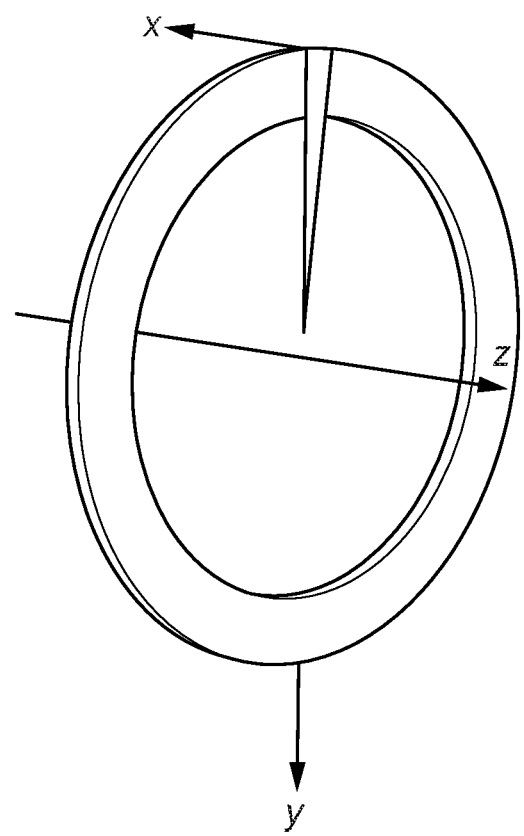

Referring now specifically to FIG. 4, one representation of the invention is an apparatus [A], [B] comprising a source of UV photons [1], one or more stand alone angular momentum generators [2] configured to deliver UV photons with optimized spin angular momentum (SAM), org orbital angular momentum (OAM), and/or a SAM/OAM [3] combination to target organic or inorganic substance and/or impurity. The angular momentum generator can have different forms [a], [b], [c], and [d].

Referring now specifically to FIG. 4 [2a], UV photons can acquire optimized OAM with a Spiral Phase Plate made of UV transparent material with refractive index n, having an inhomogeneous thickness, h proportional to the azimuthal angle Φ

$$h = h_s \frac{\phi}{2\pi} + h_0$$

where $h_s$ is the step height, and $h_0$ is the base height. When a beam of electromagnetic radiation (Gaussian) with plane phase distribution passes through this OAM generator, an optical vortex charge q is imprinted according to $$q = \frac{h_s(n - n_0)}{\lambda}$$

This means that the output beam of electromagnetic radiation will carry OAM per photon equal to qℏ, where ℏ is the Reduced Planck's constant. For a given electromagnetic wavelength λ in the UV range of the electromagnetic spectrum, then the vortex charge q can be engineered by controlling the optical step $h_s$.

Referring now specifically to FIG. 4 [2b], UV photons can acquire optimized OAM by passing flux of electromagnetic radiation having incident circular Lauerre-Gaussian through a computer generated diffraction grating with groove bifurcation known as fork holograms, pitchfork holograms, or fork-like holograms. If as single groove divides into μ+1 branches then the n-order diffracted beam of electromagnetic radiation acquires the optical vortex (photons carrying OAM) with topological charge l=μn

[2b] shows fork hologram with a single groove that divides into 1 branch, therefore μ=1. For a given electromagnetic wavelength λ in the UV range of the electromagnetic spectrum, then the topological vortex charge l can be engineered by controlling the number of branches. For operation for a given electromagnetic wavelength λ in the UV range, the diffraction grating needs to be fabricated with features equal of smaller than said wavelength λ.

Computer generated holograms that function as angular momentum generators can be designed and fabricated as phase filters that also exhibit super-resolving capabilities. Super-resolution diffracting elements are designed numerally by modifying a pattern of concentric rings similar to those illustrated in [2c]. Super-resolved Phase filters that function as angular momentum generators can be based on the so-called use a design methods based on the so-called "Prior Discrete Fourier Transformation" (PDFT). For operation for a given electromagnetic wavelength λ in the UV range, concentric ring patterns, and PDFT patterns must be fabricated with features equal of smaller than said wavelength λ.

[2c] shows a Q-plate used as SAM/OAM angular momentum generator. Similarly to a Spiral Phase Plate [2a], a Q-plate influences electromagnetic radiation by making it interact with matter that is both optically inhomogeneous and anisotropic. The design of a Q-plate can be implemented dynamically using liquid crystals, and polymers, or sub-wavelength gratings. For operation for a given electromagnetic wavelength λ in the UV range, the patterns created with liquid crystals or polymers, and the features of the gratings must be equal of smaller than said wavelength λ.

[2d] shows a thin single domain magnetic needle approximating a magnetic monopole used to generate an optical vortex (OAM carrying photons) angular momentum generator. A beam of electromagnetic radiation is passed through a through a round aperture upon which a thin-tip magnetic rod is secured. OAM tuning is controlled by the magnetization of the single domain magnetic needle.

Figure 5A:
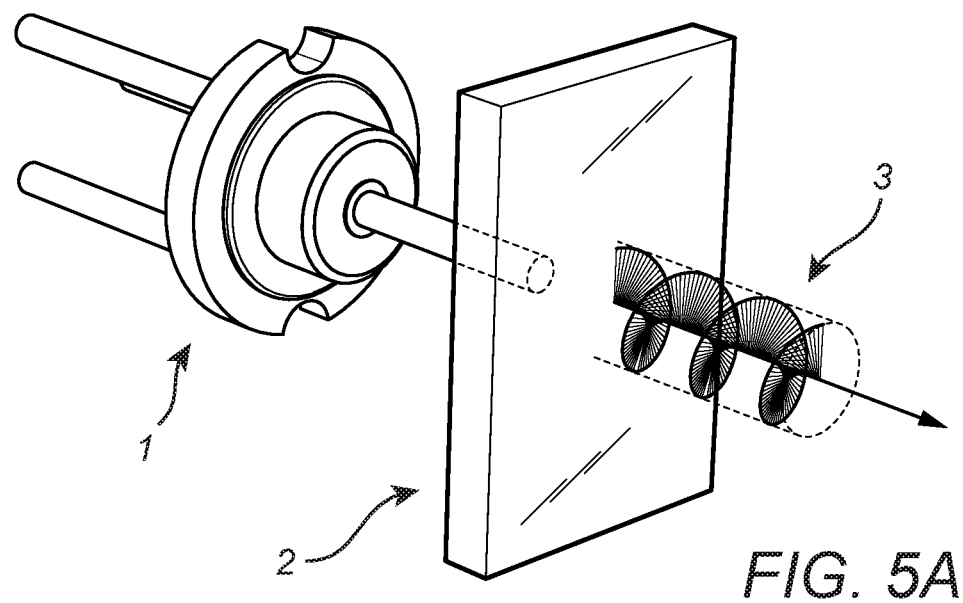
FIG. 5 is a schematic diagram illustrating another exemplary embodiment of the system and method for the enhanced treating of matter with engineered angular momentum UV photons.
Figure 5B:
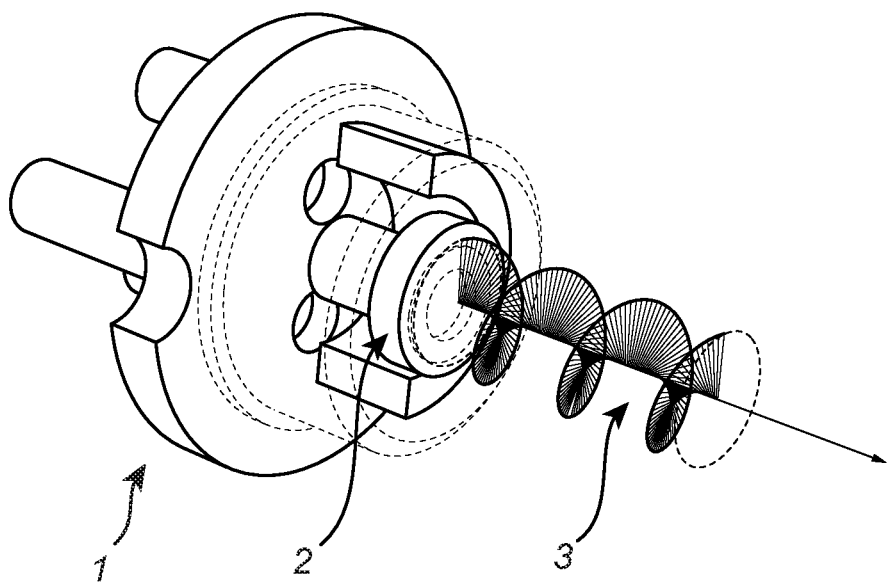
Figure 5C:
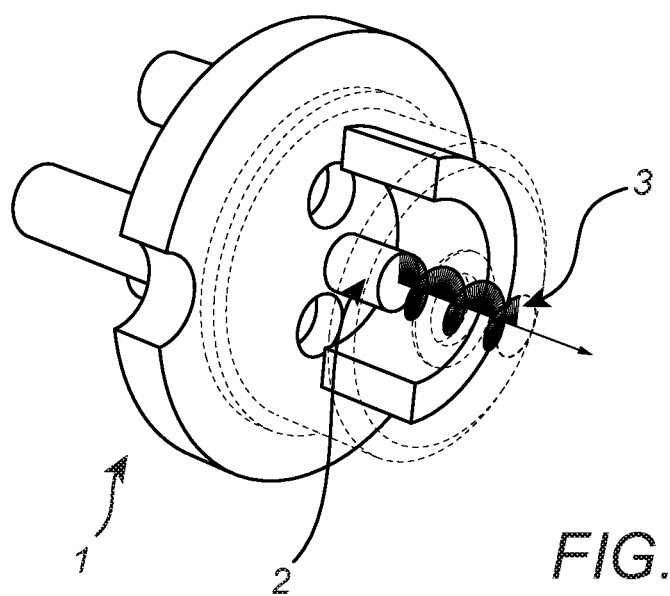

Referring now specifically to FIG. 5, one representation of the invention is an apparatus [A], [B], and [C] comprising a source of UV photons such as, but not limited to a UV Laser, a UV Light Emitting Diode, or a UV emitting plasma discharge lamps [1], one or more stand alone angular momentum generators [2] configured to deliver UV photons with optimized spin angular momentum (SAM), org orbital angular momentum (OAM), and/or a SAM/OAM [3] combination to target organic or inorganic substance and/or impurity. In this particular incarnation, the idea is to have a design for an optimized angular generator such as a Spiral Phase Plate, a hologram, a Q-plate, or a single domain magnetic needle approximating a magnetic monopole that can be fabricated and scaled using Very large Scale Integration (VLSI) fabrication techniques so that the device can be fabricated—as an array or not—onto the surface of a freestanding UV transparent medium, FIG. 5 [A][2], or onto the surface of a UV transparent window (an aperture) such as the UV transparent window of a packaged UV Laser Diode, FIG. 5 [B][2]. Since hologram features must be equal or smaller then the UV wavelength (400 nm or smaller), then VLSI fabrication techniques can be used to integrate an optimized angular generator such as a Spiral Phase Plate, a hologram, a Q-plate, or a single domain magnetic needle approximating a magnetic monopole onto the surface of a solid state die (Laser Diode, Light Emitting Diode, Microplasma Discharge Bulb" as shown in FIG. 5 [C][2].

Figure 6:
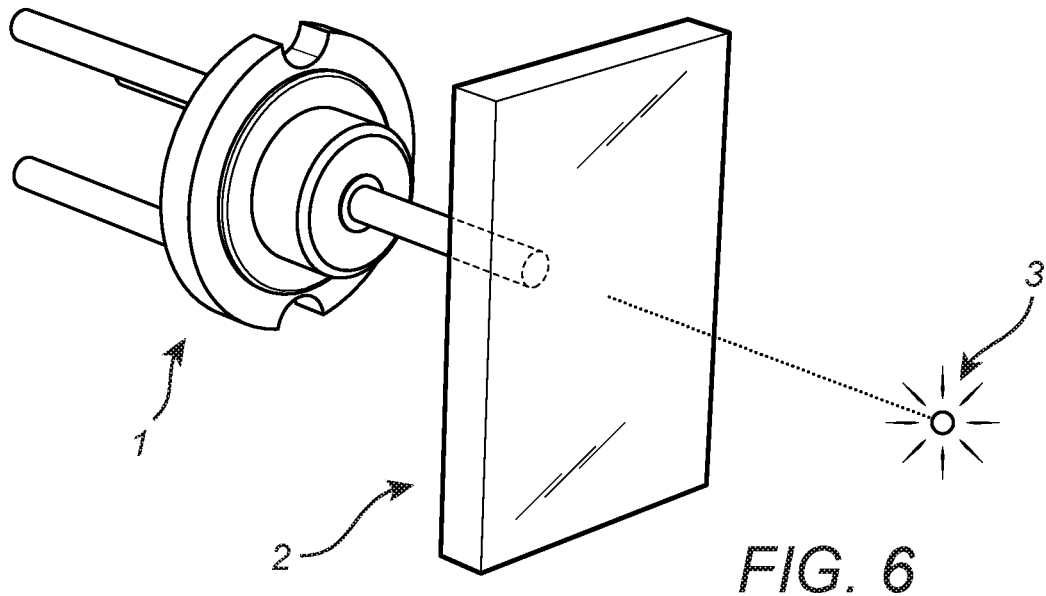
FIG. 6 is a schematic diagram illustrating another exemplary embodiment of the system and method for the enhanced treating of matter with engineered angular momentum UV photons.

Referring now specifically to FIG. 6, one representation of the invention is an apparatus comprising a source of UV photons such as, but not limited to a UV Laser, a UV Light Emitting Diode, or a UV emitting plasma discharge lamps [1], an angular momentum generator that is also a PDFT phase filter that exhibits super-resolving capabilities [2] configured to deliver a super-resolved beam of UV photons with optimized spin angular momentum (SAM), org orbital angular momentum (OAM), and/or a SAM/OAM combination [3] that can be efficiently coupled to fiber optics [4] to target organic or inorganic substance and/or impurity. In this particular incarnation PDFT patterns must be fabricated with features equal of smaller than said wavelength λ.

Figure 7A:
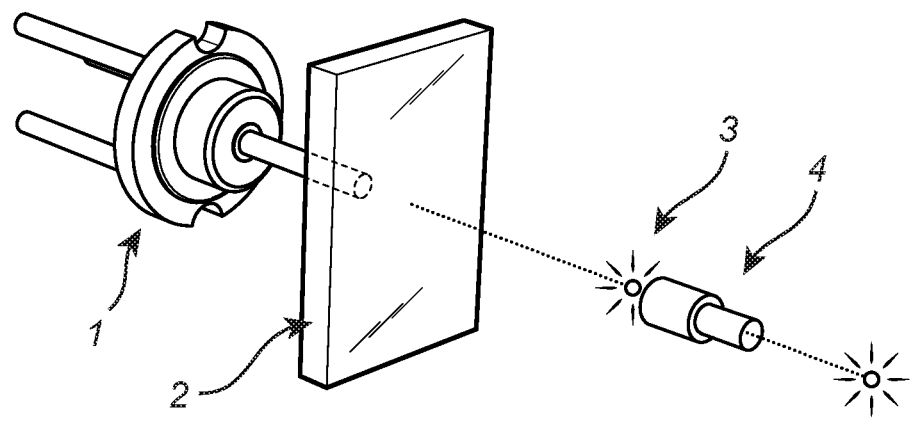
FIG. 7 is a schematic diagram illustrating another exemplary embodiment of the system and method for the enhanced treating of matter with engineered angular momentum UV photons.
Figure 7B:
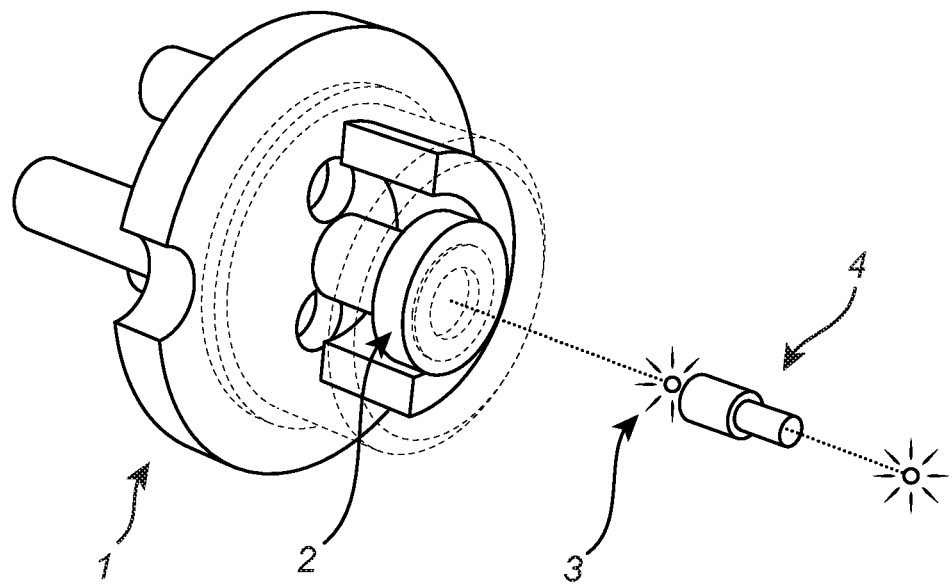
Figure 7C:
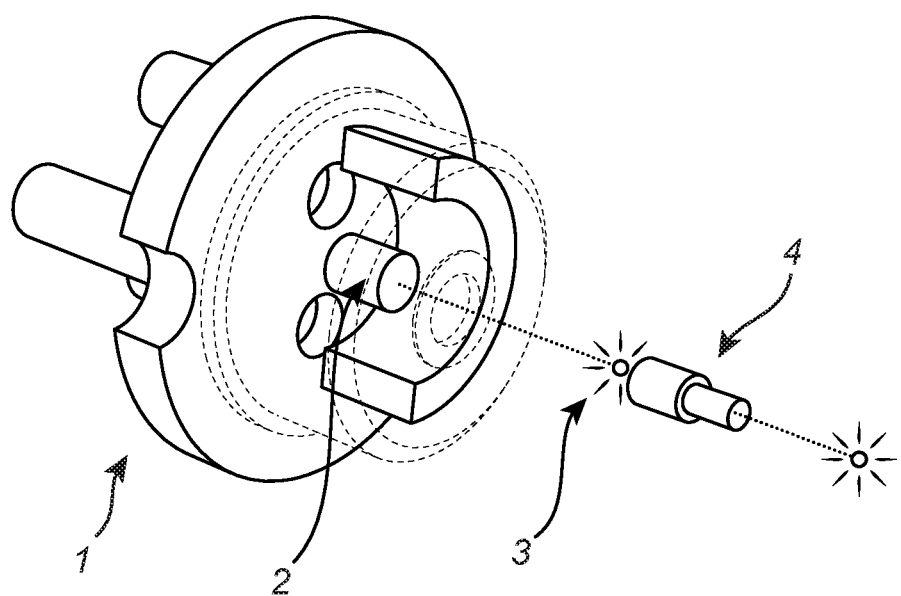
Figure 8A:
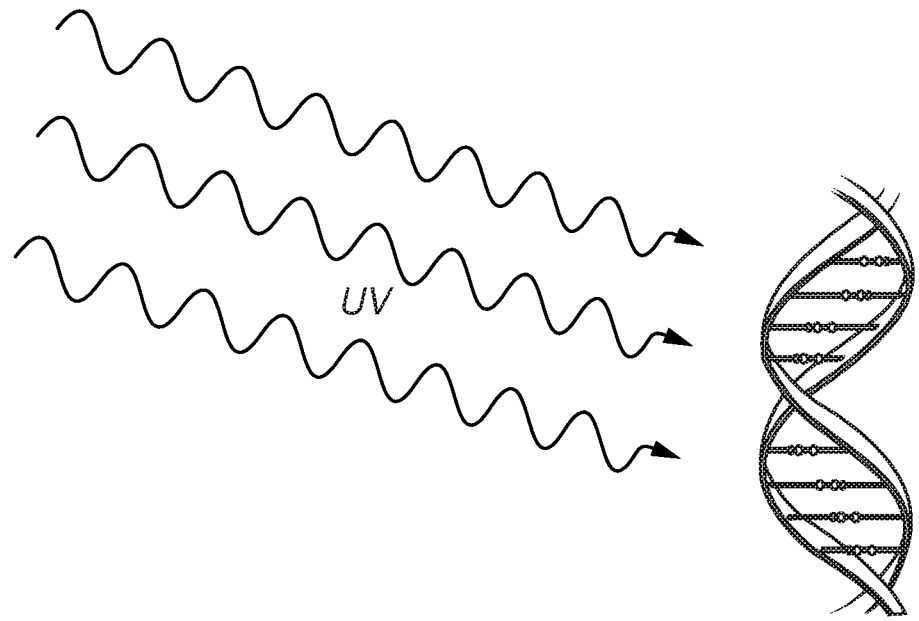
FIG. 8 is a schematic diagram illustrating the effect of the invention of using UV photons with engineered angular momentum to treat matter.
Figure 8B:
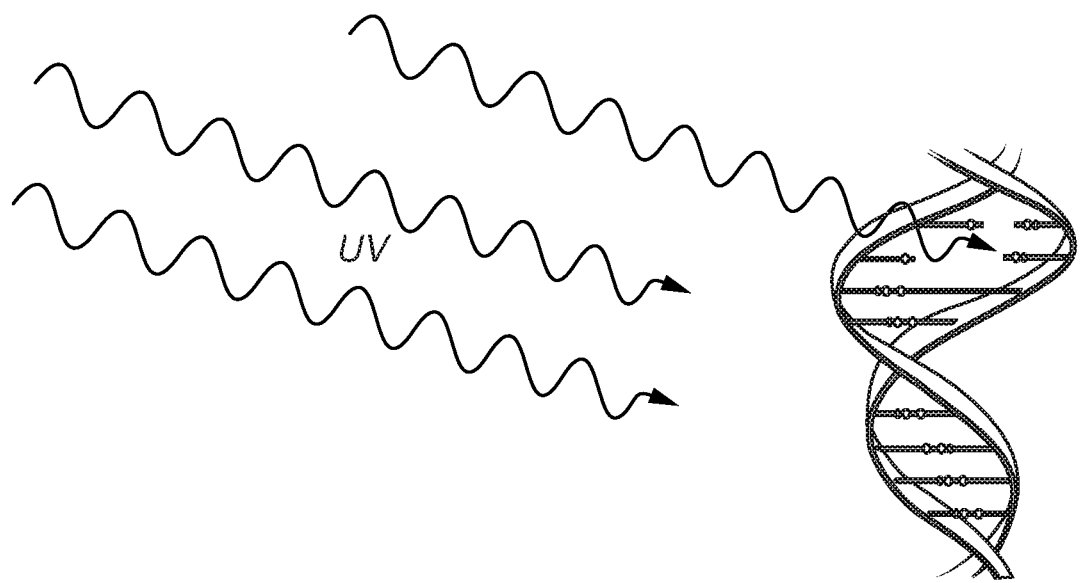
Figure 8C:
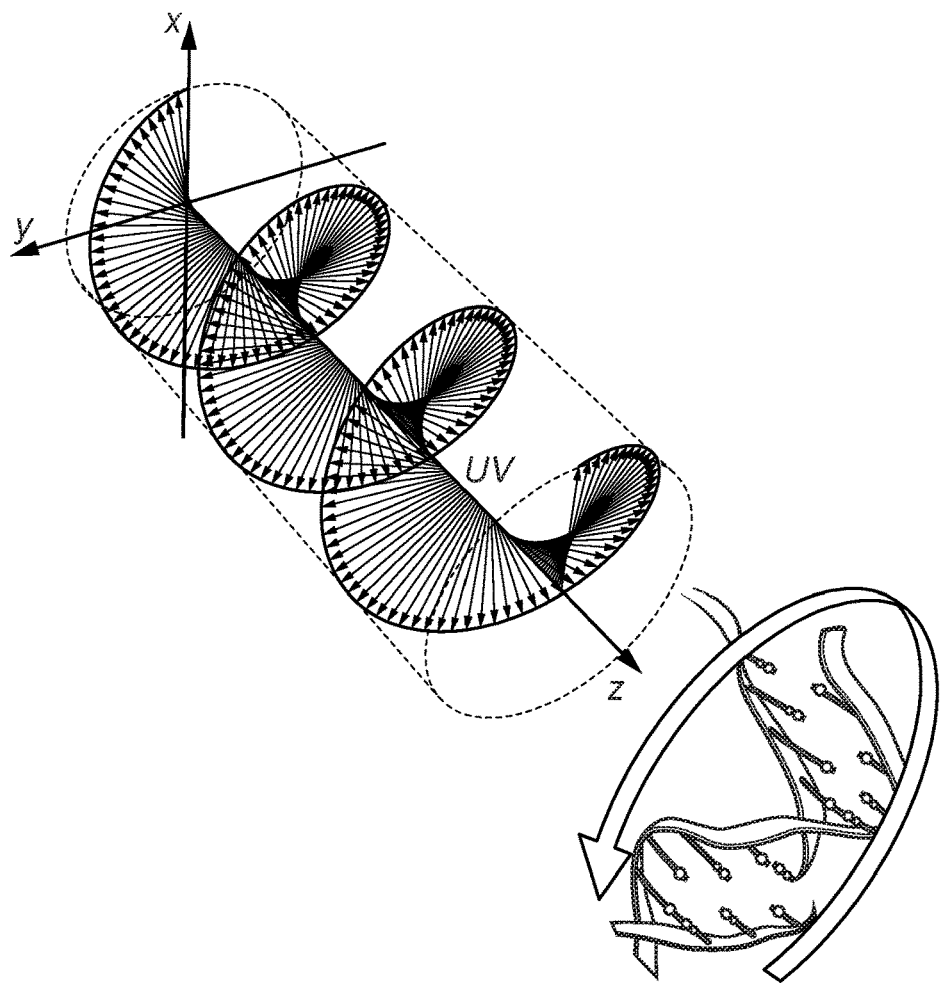
Figure 8D:
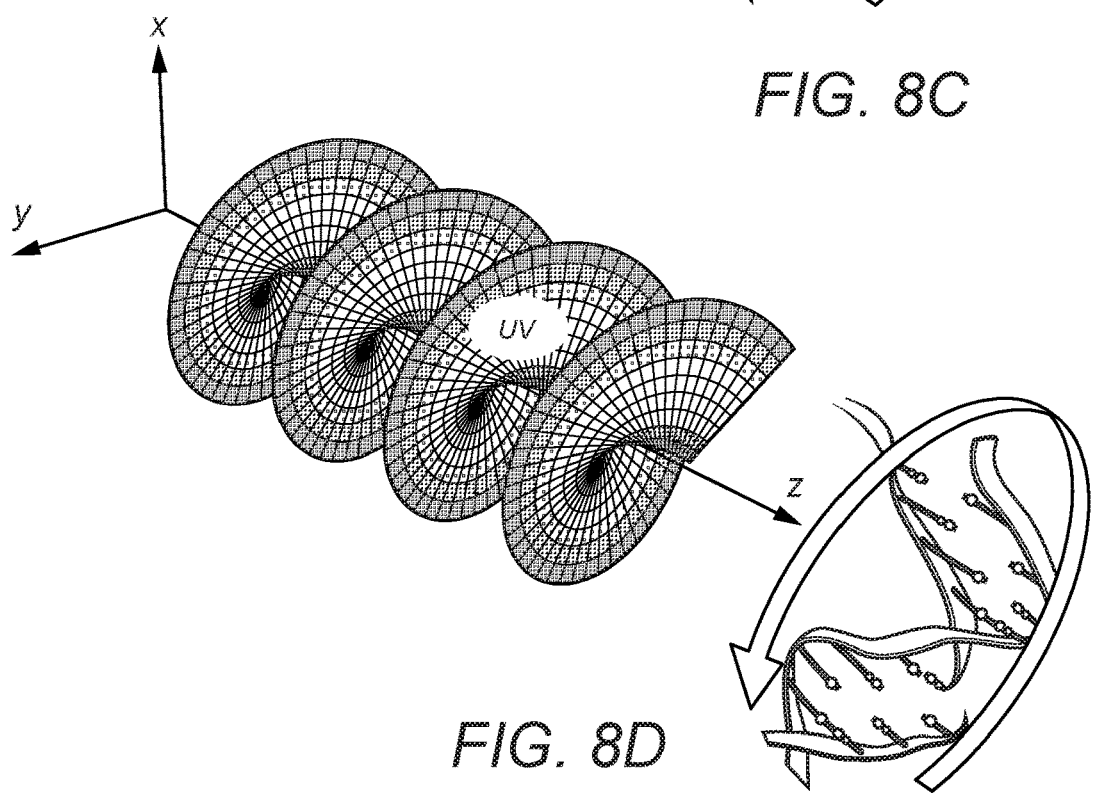
Figure 9A:
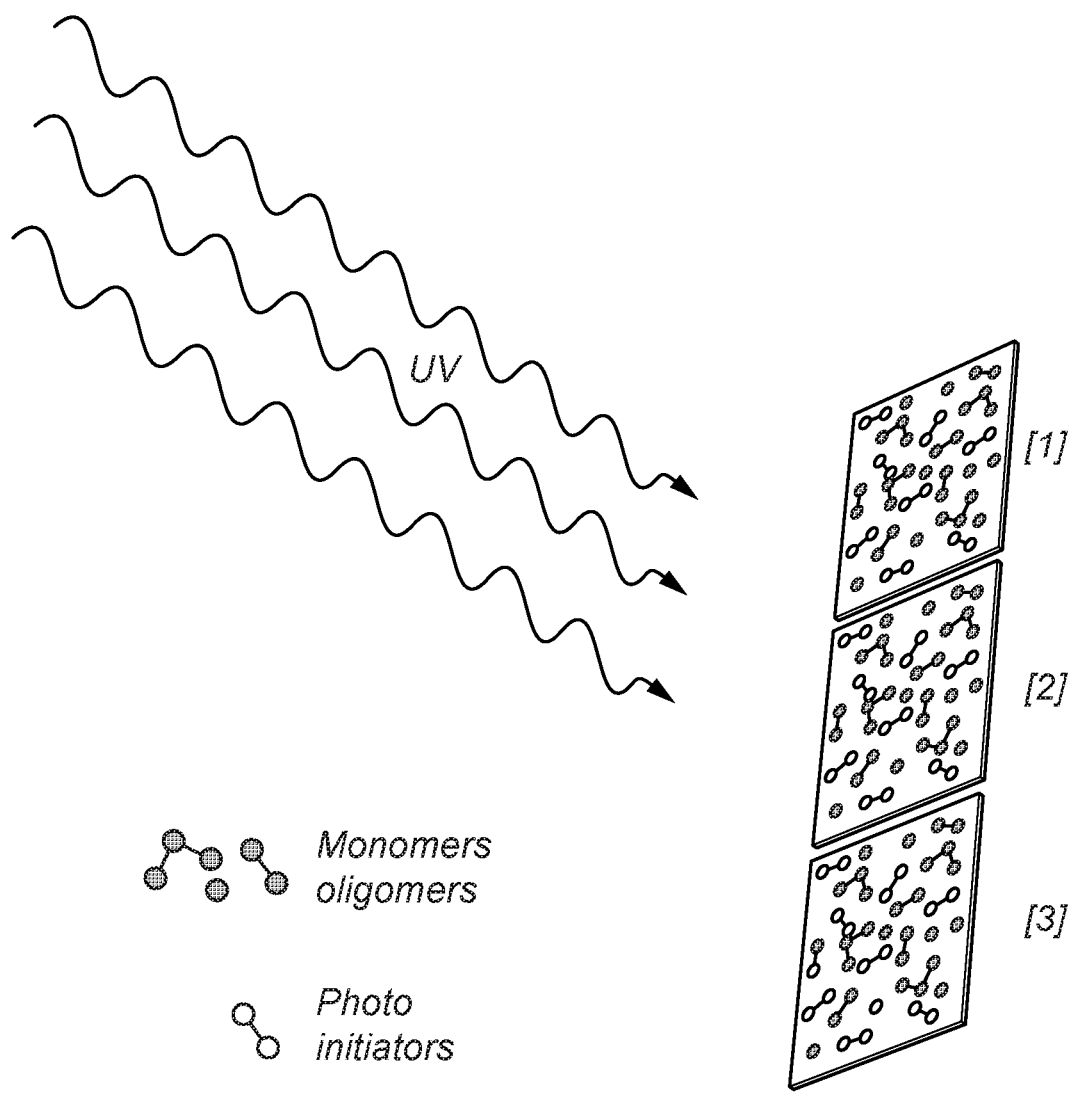
FIG. 9 is another schematic diagram illustrating the effect of the invention of using UV photons with engineered angular momentum to treat matter.
Figure 9B:
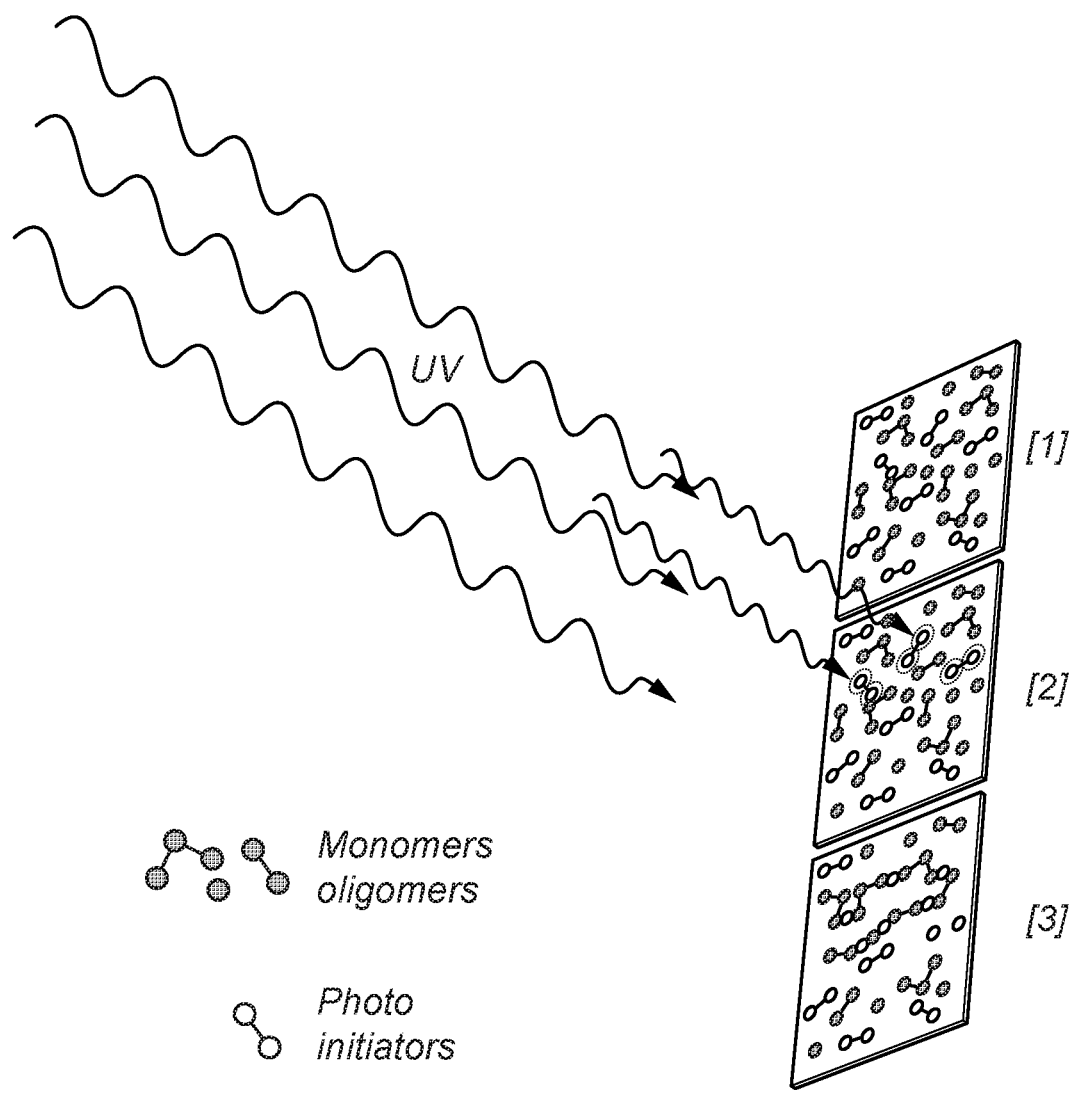
Figure 9C:
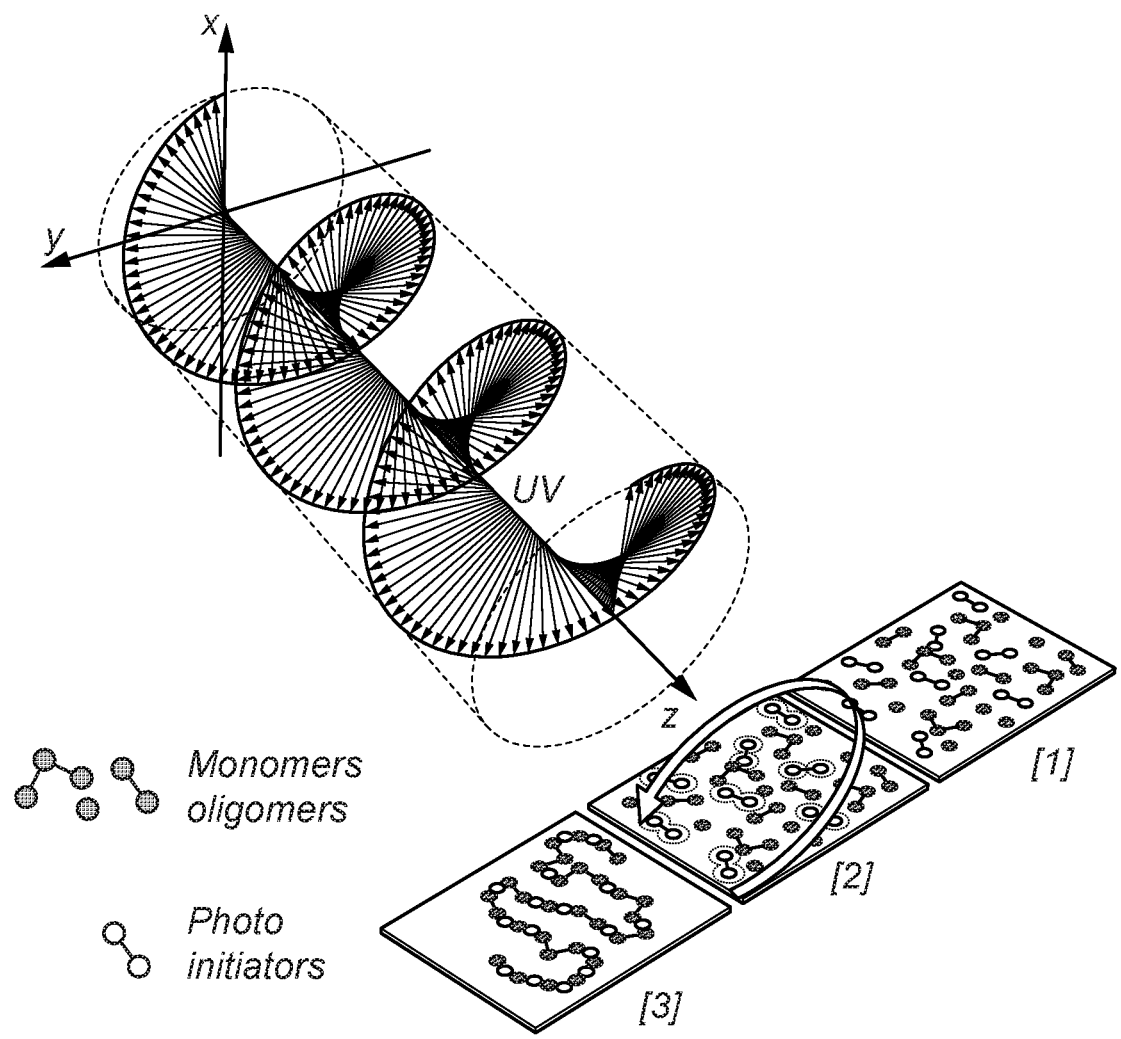
Figure 9D:
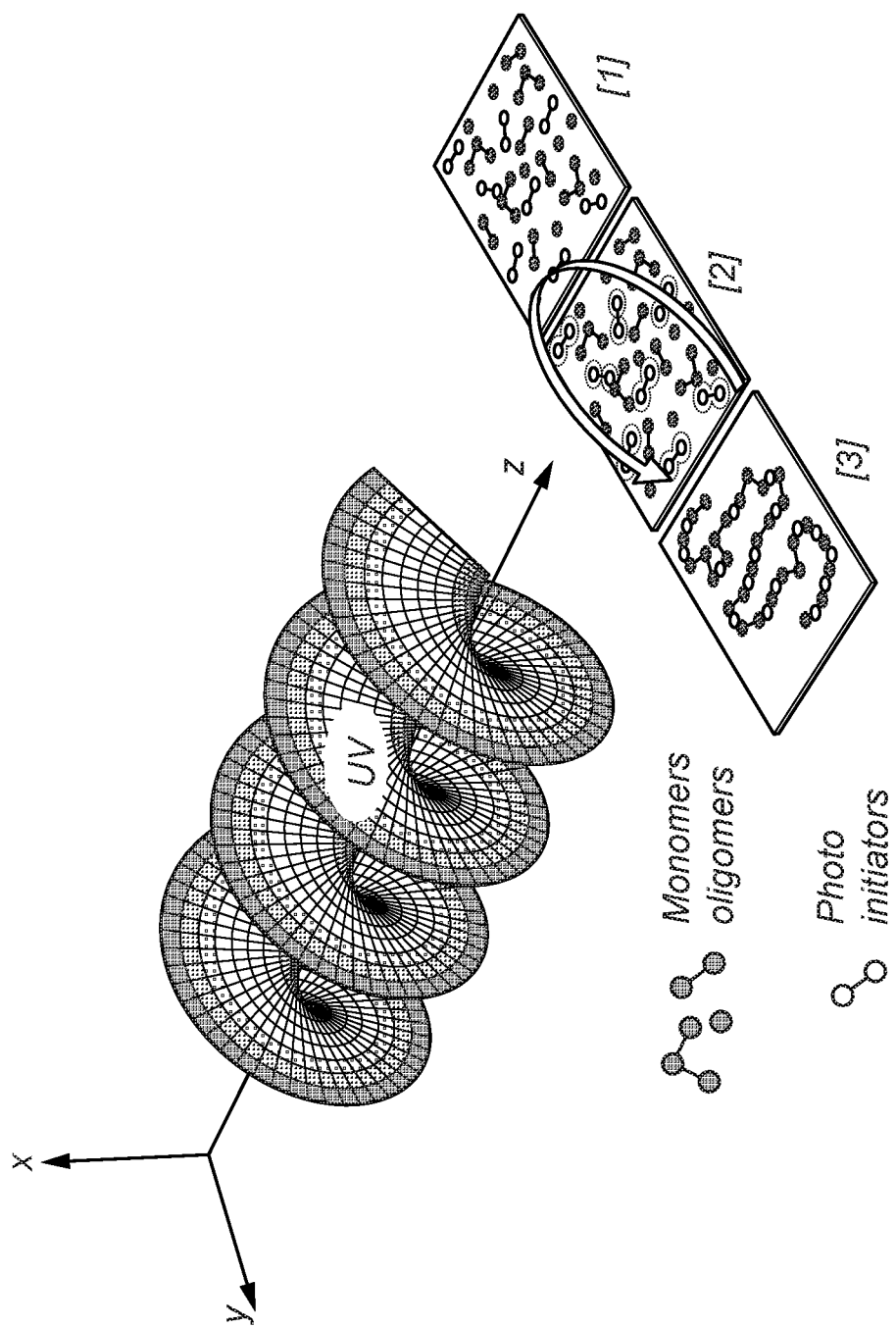

Referring specifically to FIG. 7, one representation of the invention is an apparatus comprising a source of UV photons such as, but not limited to a UV Laser, a UV Light Emitting Diode, or a UV emitting plasma discharge lamps [1], an angular momentum generator that is also a PDFT phase filter that exhibits super-resolving capabilities [2] configured to deliver a super-resolved beam of UV photons with optimized spin angular momentum (SAM), org orbital angular momentum (OAM), and/or a SAM/OAM combination [3] that can be efficiently coupled to fiber optics [4] to target organic or inorganic substance and/or impurity. In this particular incarnation, the idea is to have a design for an angular momentum generator that is also a PDFT phase filter that exhibits super-resolving capabilities that can be fabricated and scaled using Very large Scale Integration (VLSI) fabrication techniques so that the device can be fabricated—as an array or not—onto the surface of a freestanding UV transparent medium, FIG. 7 [A] [2], or onto the surface of a UV transparent window (an aperture) such as the UV transparent window of a packaged UV Laser Diode, FIG. 7 [B][2]. Since the features of the momentum generator/PDFT super resolving phase filter must be equal or smaller then the UV wavelength (400 nm or smaller), then VLSI fabrication techniques can be used to integrate it onto the surface of a solid state die (Laser Diode, Light Emitting Diode, Microplasma Discharge Bulb" as shown in FIG. 8 [C][2].

Referring now specifically to FIG. 8, one representation of the enhanced damage to nucleic acid with germicidal UV photons carrying optimized spin angular momentum (SAM) [C], and/or orbital angular momentum (OAM) [D]. Angular momentum transferred to nucleic acid, which is bound and not free to spin or rotate, causes torsional torque resulting in enhanced, and difficult to repair disruption and damage. In comparison, UV photos not carrying angular momentum [A] are known to cause damage to nucleic acids [B] but this kind of damage may or may not results from a chain of statistical events, and it can be repaired.

Figure 10:
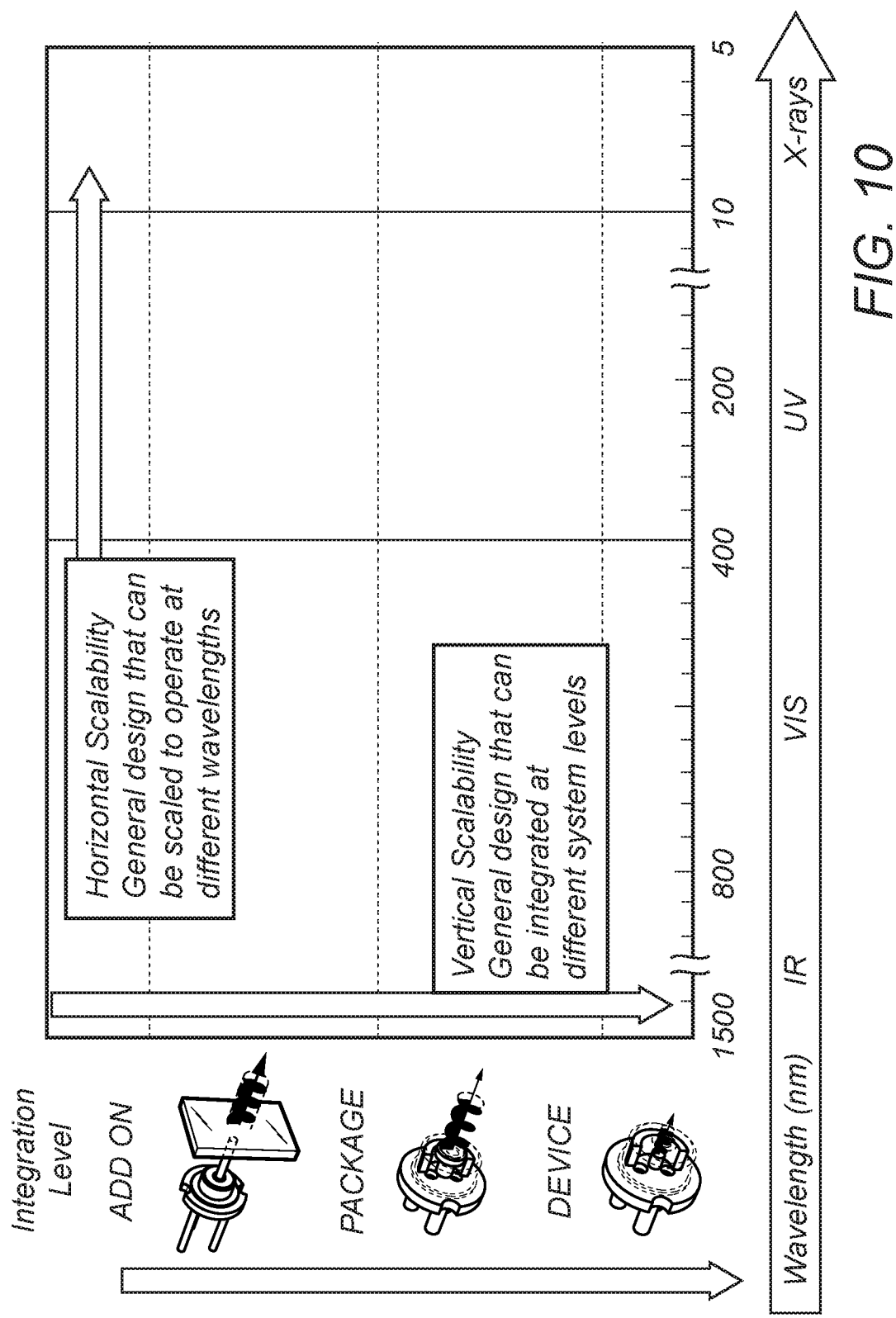
FIG. 10 is a schematic diagram illustrating the domain of application of the current innovation.

Referring now specifically to FIG. 9, one representation of the conceptualized exchange of optimized spin angular momentum (SAM) [C] and/or optimized orbital angular momentum (OAM) [D] carried by UV photons that interact with matter. In this particular example, matter is represented by a UV curable polymer that results from the linking of monomers, oligomers and UV excited photo initiators. UV curable precursors [A][1], [B][1], [C][1], and [D][1] are inert until UV photons carrying sufficient energy can be absorbed by photoinitiators [B][2], [C][2], and [D][2], which will link monomers and oligomers into a chain of polymers [B][3], [C][3], and [D][3]. UV photons carrying optimized spin angular momentum (SAM) and/or optimized orbital angular momentum (OAM) will transfer their momentum to matter and so increase the probability for photoinitiators to absorb these photons [C][2], and [D][2]. This results in an enhanced polymerization [C][3], and [D][3], Referring now specifically to FIG. 10, the representation of range of operation of the invention in the UV segment of the electromagnetic spectrum: from 400 nm to 10 nm. Illustrated are also the concept of Horizontal Scalability (HS), and Vertical Scalability (VS). HS implies a general design that can be scaled to operate at different wavelength within said electromagnetic spectrum. VS implies a general design that can integrated at different system levels.

One further embodiment of the invention is comprising a source of near-UV and/or UV photons, one or more stand alone angular momentum generators configured to deliver near-UV and/or UV photons with or without optimized spin angular momentum (SAM), or orbital angular momentum (OAM), and/or a combined SAM/OAM, which includes the an algorithm and/or design to achieve super-resolution with near-UV and/or UV radiation (coherent or incoherent), such as the super-resolution algorithm called Prior Discrete Fourier Transformation (PDFT).

One further embodiment of the invention is comprising a source of near-UV and/or UV photons, one or more stand alone angular momentum generators configured to deliver near-UV and/or UV photons with or without optimized spin angular momentum (SAM), or orbital angular momentum (OAM), and/or a combined SAM/OAM, which includes the an algorithm and/or design to achieve super-resolution with near-UV and/or UV radiation (coherent or incoherent), such as [1] lenses designed numerically by modifying a pattern of concentric rings until the target design is obtained, [2] nonlinear design algorithms, which optimize the zone width of domains of constant phase inside the DOE aperture, either matching a finite set of signal samples, or optimizing additional components of a more complex cost function, and/or [3] super-resolution elements based on the concept of super-oscillations.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A system for generating and transferring near-UV and/or UV photons with engineered angular momentum to matter and to treat organic or inorganic substances and/or impurities, the system comprising:
   one of a coherent source, a partially-coherent source, and an incoherent source of one or more of near-UV photons and UV photons; and
   one or more angular momentum generators configured to impart the one or more of the near-UV photons and the UV photons with one or more of spin angular momentum (SAM) and orbital angular momentum (OAM), wherein the one or more angular momentum generators is/are operable for providing the one or more of the SAM and the OAM that is sufficient to cause torque alteration in target matter that is statistically too great to be reversed;
   wherein the angular momentum generators are one or more of fabricated as stand-alone structures, fabricated on a package of the one of the coherent source, the partially-coherent source, and the incoherent source, and fabricated as an integral part of the one of the coherent source, the partially-coherent source, and the incoherent source.

2. The system of claim 1, further comprising means for obtaining one or more of super-resolution near-UV photons and super-resolution UV photons one or more of fabricated as a stand-alone structure, fabricated on the package of the one of the coherent source, the partially-coherent source, and the incoherent source, and fabricated as an integral part of the one of the coherent source, the partially-coherent source, and the incoherent source.

3. The system of claim 1, wherein the one or more angular momentum generators comprise one or more Spiral Phase Plates made of a UV transparent material operable for imparting OAM.

4. The system of claim 1, wherein the one or more angular momentum generators comprise one or more computer generated diffraction gratings with groove bifurcation comprising one of a fork hologram, a pitchfork hologram, and a fork-like hologram operable for imparting OAM by passing a flux of electromagnetic radiation having incident circular Lauerre-Gaussian through the computer generated diffraction grating.

5. The system of claim 4, wherein the one or more computer generated diffraction gratings comprise one or more phase filters exhibiting super-resolution capabilities.

6. The system of claim 1, wherein the one or more angular momentum generators comprise one or more Q-plates operable for imparting one or more of SAM and OAM.

7. The system of claim 6, wherein the one or more Q-plates are implemented dynamically using one or more of liquid crystals, polymers, and subwavelength gratings.

8. The system of claim 1, wherein the one or more angular momentum generators comprise one or more thin single domain magnetic needles approximating a magnetic monopole used to generate an optical vortex operable for imparting OAM.

9. The system of claim 1, wherein the one of the coherent source, the partially-coherent source, and the incoherent source comprises one of a UV Laser, a UV Light Emitting Diode, and a UV emitting plasma discharge lamp.

10. The system of claim 1, wherein the one or more angular momentum generators comprise a Prior Discrete Fourier Transformation (PDFT) phase filter that exhibits super-resolving capabilities configured to deliver a super-resolved beam configured to be coupled to an optical fiber.

11. A system for generating and transferring a super-resolved beam of near-UV and/or UV photons with engineered angular momentum to matter and to treat organic or inorganic substances and/or impurities, the system comprising:
    one of a coherent source, a partially-coherent source, and an incoherent source of one or more of near-UV photons and UV photons;
    means for obtaining one or more of super-resolution near-UV photons and super-resolution UV photons; and
    one or more angular momentum generators configured to impart the one or more of the near-UV photons and the UV photons with one or more of spin angular momentum (SAM) and orbital angular momentum (OAM), wherein the one or more angular momentum generators is/are operable for providing the one or more of the SAM and the OAM that is sufficient to cause torque alteration in target matter that is statistically too great to be reversed;
    wherein the means for obtaining and the angular momentum generators are one or more of fabricated as stand-alone structures, fabricated on a package of the one of the coherent source, the partially-coherent source, and the incoherent source, and fabricated as an integral part of the one of the coherent source, the partially-coherent source, and the incoherent source.

12. The system of claim 11, wherein the one or more angular momentum generators comprise one or more Spiral Phase Plates made of a UV transparent material operable for imparting OAM.

13. The system of claim 11, wherein the one or more angular momentum generators comprise one or more computer generated diffraction gratings with groove bifurcation comprising one of a fork hologram, a pitchfork hologram, and a fork-like hologram operable for imparting OAM by passing a flux of electromagnetic radiation having incident circular Lauerre-Gaussian through the computer generated diffraction grating.

14. The system of claim 13, wherein the one or more computer generated diffraction gratings comprise one or more phase filters exhibiting super-resolution capabilities.

15. The system of claim 11, wherein the one or more angular momentum generators comprise one or more Q-plates operable for imparting one or more of SAM and OAM.

16. The system of claim 15, wherein the one or more Q-plates are implemented dynamically using one or more of liquid crystals, polymers, and subwavelength gratings.

17. The system of claim 11, wherein the one or more angular momentum generators comprise one or more thin single domain magnetic needles approximating a magnetic monopole used to generate an optical vortex operable for imparting OAM.

18. The system of claim 11, wherein the one of the coherent source, the partially-coherent source, and the incoherent source comprises one of a UV Laser, a UV Light Emitting Diode, and a UV emitting plasma discharge lamp.

19. The system of claim 11, wherein the one or more angular momentum generators comprise a Prior Discrete Fourier Transformation (PDFT) phase filter that exhibits super-resolving capabilities configured to deliver a super-resolved beam configured to be coupled to an optical fiber.

20. A system for generating a super-resolved beam of near-UV and/or UV photons, the system comprising:

one of a coherent source, a partially-coherent source, and an incoherent source of one or more of near-UV photons and UV photons;

means for obtaining one or more of super-resolution near-UV photons and super-resolution UV photons; and one or more angular momentum generators configured to impart the one or more of the near-UV photons and the UV photons with one or more of spin angular momentum (SAM) and orbital angular momentum (OAM), wherein the one or more angular momentum generators is/are operable for providing the one or more of the SAM and the OAM that is sufficient to cause torque alteration in target matter that is statistically too great to be reversed;

wherein the means for obtaining and the angular momentum generators are one or more of fabricated as stand-alone structures, fabricated on a package of the one of the coherent source, the partially-coherent source, and the incoherent source, and fabricated as an integral part of the one of the coherent source, the partially-coherent source, and the incoherent source.

\* \* \* \* \*